United States Patent
Leng

(10) Patent No.: US 10,855,490 B2
(45) Date of Patent: Dec. 1, 2020

(54) TRANSMISSION DURATION REPORT AND TRANSMISSION TARGET TIME ALLOCATION FOR CONTROLLER AREA NETWORK SYNCHRONIZATION

(71) Applicant: Hamilton Sundstrand Corporation, Charlotte, NC (US)

(72) Inventor: Qiuming Leng, South Barrington, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/354,847

(22) Filed: Mar. 15, 2019

(65) Prior Publication Data
US 2020/0295966 A1    Sep. 17, 2020

(51) Int. Cl.
*G06F 15/16* (2006.01)
*H04L 12/40* (2006.01)
*H04L 12/403* (2006.01)

(52) U.S. Cl.
CPC ...... *H04L 12/40019* (2013.01); *H04L 12/403* (2013.01); *H04L 12/40013* (2013.01); *H04L 2012/4028* (2013.01); *H04L 2012/40215* (2013.01)

(58) Field of Classification Search
CPC ......... H04L 12/40019; H04L 12/40013; H04L 12/403; H04L 2012/40215; H04L 2012/4028
See application file for complete search history.

(56) References Cited

U.S. PATENT DOCUMENTS

| 5,090,013 A * | 2/1992 | Fadem .................. G06F 13/372 370/449 |
| 2001/0055311 A1* | 12/2001 | Trachewsky .......... H04L 1/0003 370/445 |

(Continued)

OTHER PUBLICATIONS

Network, Controller Area. "Part 1: Data link layer and physical signaling." International Standard ISO (2003): 11898-1 (52 pages).

(Continued)

*Primary Examiner* — Jonathan A Bui
(74) *Attorney, Agent, or Firm* — Cantor Colburn LLP

(57) ABSTRACT

A CAN network synchronization method identifies a sync master node from a plurality of nodes, and designates each of the remaining nodes as a sync slave node. The method further designates a message from the sync master node as a sync message, and assigns a lowest number to the message ID of the sync message. The method further assigns a unique node ID to each sync slave node, and assigns a unique message ID to a transmission duration report message from a sync slave node. The method further assigns a unique message ID to a transmission target time allocation message from the sync master node. The method also performs a handshake operation between the sync slave nodes and the sync master node to exchange message burst transmission durations ($T_{sst}$), transmission target times ($T_{TXtarget}$), and a common time reference point, and conducts time adjustment on each sync slave node.

20 Claims, 10 Drawing Sheets

(56) References Cited

U.S. PATENT DOCUMENTS

| | | | | |
|---|---|---|---|---|
| 2008/0198868 A1* | 8/2008 | Fuehrer | .................... | G06F 1/14 |
| | | | | 370/442 |
| 2009/0323708 A1* | 12/2009 | Ihle | ........................ | G06F 13/28 |
| | | | | 370/402 |
| 2013/0094373 A1* | 4/2013 | Reidl | ................. | H04L 25/4902 |
| | | | | 370/252 |
| 2014/0280636 A1 | 9/2014 | Fredriksson et al. | | |
| 2014/0325102 A1* | 10/2014 | Opitz | ................. | G06F 13/4256 |
| | | | | 710/110 |
| 2015/0331422 A1* | 11/2015 | Hartung | ................ | G05D 1/021 |
| | | | | 701/23 |
| 2015/0365338 A1* | 12/2015 | Pannell | ................ | H04L 49/253 |
| | | | | 370/412 |
| 2016/0080533 A1* | 3/2016 | Jeon | ................... | H04L 12/6418 |
| | | | | 370/402 |
| 2016/0309404 A1* | 10/2016 | Kasslin | ................ | H04W 48/18 |
| 2017/0139411 A1* | 5/2017 | Hartung | ............... | G05D 1/0077 |
| 2017/0317812 A1* | 11/2017 | Leng | .................... | H04L 12/403 |
| 2018/0152364 A1 | 5/2018 | Lee et al. | | |

OTHER PUBLICATIONS

Extended European Search Report issued in European Application No. 19212124.2; Application Filing Date Nov. 28, 2019; dated Apr. 28, 2020 (8 pages).

\* cited by examiner

TRANSMISSION DURATION REPORT AND TRANSMISSION TARGET TIME ALLOCATION FOR CONTROLLER AREA NETWORK SYNCHRONIZATION

BACKGROUND

The present disclosure relates to data communication networks, and more particularly, to techniques for synchronizing nodes on a controller area network (CAN).

A controller area network (CAN) is a vehicle bus standard designed to allow microcontrollers and devices to communicate with each other. CAN networks include a message-based protocol that was originally designed for multiplex electrical wiring in road vehicles. Due to its real time and data collision avoidance properties, CAN has been widely used in the other industries including aerospace.

A CAN such as those operating according to the ISO 11898-1:2003 standard, for example, may include two or more communication nodes, called CAN nodes or simply nodes. A CAN node includes a microcontroller, an application interface and a CAN controller, as shown in FIG. 1. The microcontroller may include a CAN application task that is commonly periodic. The periodic CAN application tasks running on microcontrollers in all the nodes typically have the same task cycle time by design, and each CAN node may transmit a group of messages (message burst) on the CAN bus and receive messages from the other nodes once every CAN task cycle. The periodic CAN messages are produced and consumed by the periodic CAN application tasks. However, since the CAN protocol does not provide accurate global time service and each node has its own clock, the CAN task cycles on the CAN nodes are not synchronized to each other, which makes the CAN task cycles with the message pack/unpack procedures in the CAN nodes and consequently message bursts on CAN bus drift toward or away from each other over time.

The lack of synchronization can cause overwritten messages and absent messages. An overwritten message occurs when two messages (with the same message identifier but possibly different settings for the same set of parameters inside), transmitted once in each of two consecutive CAN task cycles from a node, are received in one CAN task cycle on a receiving node. This phenomenon can result in a lost message on the receiving node, where either the older or the newer message gets dropped depending on the CAN application interface setup. An absent message occurs when a message, transmitted once every CAN task cycle from a transmission node, is supposed to be but is not received in a CAN task cycle on a receiving node, which can result in stale data from the previously received message being used by the applications. The jitters from different procedures executing on the microcontroller in the CAN node can worsen the effects of overwritten and absent message. CAN bus contention, where multiple CAN nodes attempt to transmit on the CAN bus at the same time and one or more CAN nodes are required to wait until the bus is free, can also worsen this effect. Lost and/or absent messages may not be tolerable in mission critical applications.

A previous attempt to solve the problems described above provided a sync master node configured to send a CAN sync message periodically. Each of the remaining nodes, sync slave nodes, then adjusts its CAN task cycle time based on the point of time the sync message is received in such a way that the message bursts (each message burst from a CAN node) from the CAN nodes are equally time-spaced on the CAN bus, which enables deterministic point to point data communication. This previous system calculates a unique sync message receiving target time relative to the CAN task cycle start time for each sync slave node based on message burst order and the measurements of message burst transmission durations of all the nodes on the network and configures/programs the calculated sync message target receiving time as predetermined data into the sync slave node. Note that if the message burst duration from any node changes, the sync message target receiving times for all the slave nodes will change. Thus with this previous attempt, if the message burst duration from any node changes, the newly calculated sync message target receiving times need to be configured/programmed into all the slave nodes correspondingly to keep the nodes synchronized on the CAN network. For instance, the changed message burst transmission duration due to messages addition on a node or the message burst transmission duration from a newly added node to the network needs to be communicated to a focal point where the new sync message target receiving times for all the sync slave nodes are recalculated and redistributed to service points where the new sync message target receiving times are reconfigured/reprogrammed into all the sync slave nodes. Such changes require close human coordination at the change initiating node, the focal point, and the service points. For a system with CAN nodes owned by different projects or different groups of a company or different companies, the coordination process can be cumbersome and error-prone.

SUMMARY

According to a non-limiting embodiment, a computer-implemented method is provided to synchronize nodes on a controller area network (CAN). The method comprises identifying, via a processor, a node from a plurality of nodes as a sync master node, and designating, via the processor, each of the remaining nodes as a sync slave node; and designating, via the processor, a first message in the periodic message burst from the sync master node as a sync message. The method further comprises assigning, via the processor, a lowest number, among the plurality of message IDs in the CAN network, to the message ID of the sync message; subscribing to the sync message on each slave node; assigning, via the processor, a unique node ID to each sync slave node; and assigning, via the processor, a unique message ID to each of a plurality of transmission duration report messages. Each transmission duration report message among the plurality of transmission duration report messages is from a respective sync slave node. The method further comprises subscribing to the plurality of transmission duration report messages on the master node; assigning, via the processor, a unique message ID to a transmission target time allocation message from the sync master node; and subscribing to the transmission target time allocation message on each slave node. The method further comprises performing a handshake operation between the sync slave nodes and the sync master node to exchange message burst transmission durations ($T_{sst}$), transmission target times ($T_{TXtarget}$), and a common time reference point; and performing a time adjustment on each sync slave node based on the slave node message burst transmission time ($T_{TX}$), its transmission target time ($T_{TXtarget}$), and sync message receiving time ($T_{syncMsgRx}$) used as the common time reference point from which ($T_{TX}$) and ($T_{TXtarget}$) are measured.

According to another non-limiting embodiment, a controller area network (CAN) synchronization system comprises a plurality of nodes, with each node including at least one processor. At least one of the processors in a node is in signal communication with at least one other processor among the plurality of nodes. At least one processor in a node is configured to identify a node as a sync master node from the plurality of nodes, and to designate each of the remaining nodes as a sync slave node, and to designate a first message in the periodic message burst from the sync master node as a sync message. The processor on the sync master node is further configured to assign a lowest number, among the plurality of message IDs in the CAN network, to the message ID of the sync message; The processor on each sync slave node subscribes to the sync message, and is configured with a unique node ID and a unique message ID to its respective transmission duration report message. The processor on the master node is further configured to subscribe to the plurality of transmission duration report messages, assign a unique message ID to a transmission target time allocation message from the sync master node. The processor on each sync slave node subscribes to the transmission target time allocation message from the sync master node. The system performs a handshake operation between the sync slave nodes and the sync master node to exchange message burst transmission durations ($T_{sst}$), transmission target times ($T_{TXtarget}$), and a common time reference point, and performs a time adjustment on each sync slave node based on the slave node message burst transmission time ($T_{TX}$), its transmission target time ($T_{TXtarget}$), and sync message receiving time ($T_{syncMsgRx}$) used as the common time reference point from which ($T_{TX}$) and ($T_{TXtarget}$) are measured.

According to yet another non-limiting embodiment, an aircraft is provided, which includes a system for synchronizing nodes on a controller area network (CAN). The system is configured to identify a sync master node from the plurality of nodes, and to designate each of remaining nodes as a sync slave node. The system is further configured to designate a first message in the periodic message burst from the sync master node as a sync message, assign a lowest number, among the plurality of message IDs in the CAN network, to the message ID of the sync message, and to subscribe to the sync message on each slave node. The system is further configured to assign a unique node ID to each sync slave node, assign a unique message ID to each of a plurality of transmission duration report messages. The system is further configured to subscribe to the plurality of transmission duration report messages on the master node, assign a unique message ID to a transmission target time allocation message from the sync master node, and subscribe to the transmission target time message on each slave node. The system performs a handshake operation between the sync slave nodes and the sync master node to exchange message burst transmission durations ($T_{sst}$), transmission target times ($T_{TXtarget}$), and a common time reference point, and performs a time adjustment on each sync slave node based on the slave node message burst transmission time ($T_{TX}$), its transmission target times ($T_{TXtarget}$), and sync message receiving time ($T_{syncMsgRx}$) used as the common time reference point from which ($T_{TX}$) and ($T_{TXtarget}$) are measured.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various non-limiting embodiments of the present invention include a communication mechanism to overcome the cumbersome and error-prone process mentioned with the previous solution. At least one embodiment of the present invention described herein provides a plurality of sync slave nodes (sync slave node sometimes is abbreviated as slave node) with CAN messages to communicate their message burst transmission durations (sometimes abbreviated as transmission burst duration or burst duration in the present invention) to the sync master node (sync master node sometimes is abbreviated as master node), and the sync master node calculates and communicates the message burst transmission target times to the sync slave nodes using CAN messages.

One or more non-limiting embodiments described herein provides a CAN synchronization scheme where each sync slave node transmits a message burst transmission duration report (sometime abbreviated as transmission burst duration report or transmission duration report in the present invention) CAN message to report its burst duration to the sync master node. The burst duration is predetermined data for a given node and is set when manufacturing of the node. Accordingly, the sync master node calculates and transmits a transmission target time (abbreviated from message burst transmission target time, or target of message burst transmission start time) in transmission target time allocation CAN message(s) to each of the sync slave nodes. Therefore, at least one non-limiting embodiment utilizes the sync master node as a focal point, the message burst transmission duration report and the transmission target time allocation CAN message(s) as communication handshake to replace the cumbersome and error-prone human coordination and facilitates changes of message addition/deletion and node addition/deletion for CAN network synchronization.

Figure 1:
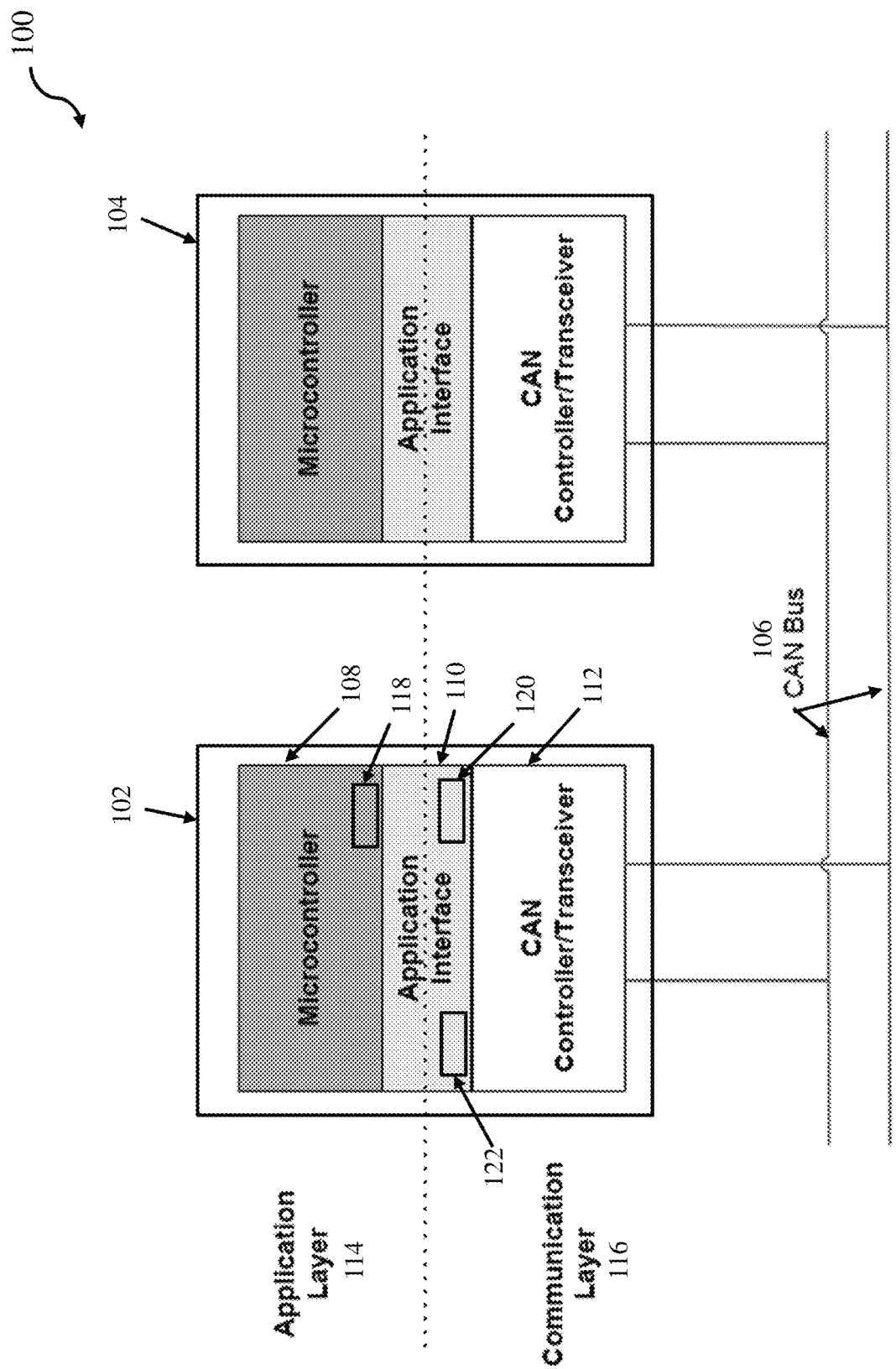
FIG. 1 depicts a block diagram of a conventional (unsynchronized) CAN communication network.

Turning now to FIG. 1, a conventional (unsynchronized) CAN 100 is illustrated from the microcontroller application perspective, although physically the CAN controller may be part of the microcontroller. For the sake of simplicity, only two nodes 102 and 104 are depicted. It should be appreciated that CAN networks may include more than two nodes.

CAN operates according to a serial bus standard for connecting Electronic Control Units (ECUs), or generally referred to as communication nodes (i.e., "nodes"). From a high level, a node (e.g., node 102) includes an application layer 114 and a communication layer 116. For a given node in conventional (unsynchronized) CAN 100, the application layer 114 and the communication layer 116 separate the microcontroller 108 and the CAN controller/transceiver 112 (hereafter "CAN controller 112") via the application interface 110. That is, the microcontroller 108 resides in the application layer 114, while the CAN controller/transceiver 112 resides in the communication layer 116. The application layer 114 may be configured to supply/consume data to/from communication layer 116, while the communication layer 116 may be configured to provide CAN protocol services. Application interface 110 facilitates data transfer between the microcontroller 108 and the CAN controller 112.

Microcontroller 108 may include a CAN application task 118. Application interface 110 may include one or more CAN receiving message boxes (or buffers) 122, and one or more CAN transmission message boxes (or buffers) 120. For the sake of brevity, message box is used for the illustration.

Microcontroller 108 may be a central processing unit, microprocessor, host processor, or other type of electronic hardware controller. Microcontroller 108 may be configured to decide what the received messages mean and what messages it wants to transmit. Other devices, including sensors, actuators and control devices can be connected to microcontroller 108. Microcontroller 108 may include one or more processors (not shown). Microcontroller 108 may be a hardware device for executing hardware and/or software instructions.

For the sake of brevity, in some embodiments, transmission or message transmission, transmitting or message transmitting, and transmit are abbreviated as Tx, and receiving or message receiving, and receive are abbreviated as Rx. A conventional (unsynchronized) CAN 100 may include individual nodes 102 and 104, connected by a CAN bus 106. Each node in a conventional CAN 100 can include a microcontroller, a CAN controller, and an application interface (as shown in node 102). For Rx, CAN controller 112 stores the received serial bits from CAN bus 106 until an entire message is available. Then CAN controller 112 may check the message integrity, and put the message body in a Rx message box 122 if the message integrity check passes. A CAN application task (e.g., CAN application task 118) running on microcontroller 108 may pick up a message body from a Rx message box 122, unpack the message body and make parameters from the received message available to the consumer applications running on the microcontroller 108. For Tx, the CAN application task 118 may pack the parameters to be transmitted into a CAN message body and put the message body in a CAN Tx message boxes 120. CAN controller 112 may pick up a message body from a Tx message box, add the message header and integrity check CRC to form a CAN message, and transmit the message on CAN bus 106 when the bus is free.

CAN application task 118 running on microcontroller 108 is commonly a periodic task, and performs packing procedure for Tx and unpacking procedure for Rx, among the other possible procedures, once every CAN task cycle. CAN application task 118 packs a set of parameters into a CAN message body and puts the message body in a CAN Tx message box 120. CAN application task 118 performs this packing procedure continuously until all the messages to be transmitted in a particular cycle are formed and put in the CAN Tx message boxes 120, while CAN controller 112 is picking up a message from a filled CAN Tx message box and transmitting the message on CAN bus 106. The CAN application task also picks up a message from a CAN Rx message box 122 and unpacks the message to a set of parameters. The CAN application task performs this unpacking procedure continuously until all the messages in Rx message boxes 122 are unpacked and parameters unpacked from the messages are available to the consumer applications on microcontroller 108.

CAN application task 118 running on microcontroller 108 can produce messages much faster than CAN controller 112 can transmit messages on CAN bus 106. As a result, by the time the CAN task is done packing and putting all the messages in CAN Tx message boxes 120, the CAN controller has only transmitted a few messages while the majority of the messages may be still waiting in CAN Tx message boxes 120. Due to the way the messages are produced and transmitted, the CAN messages from a node appear to be a burst of messages (a group of messages back to back with little time gap in between, described hereafter as a "message burst") on CAN bus 106. This optimizes the CAN bus bandwidth utilization, and allows CAN application task 118 to perform other procedures after packing procedure, such as the unpacking procedure for Rx messages, while CAN controller/transceiver 112 on the same node is still transmitting.

The periodic CAN application tasks in the nodes on a CAN bus commonly have the same task cycle time by design, and each CAN node transmits a group of messages (message burst) on the bus and receives certain messages from the other nodes once every its CAN task cycle. Tx messages are produced and Rx messages are consumed by the periodic CAN application tasks. However, since the CAN protocol does not provide accurate global time service and each node has its own clock, the CAN task cycles on the CAN nodes are not synchronized to each other, which makes the timing of CAN task cycles along with the message pack/unpack procedures, and consequently the message bursts from the nodes on CAN bus, drift toward or away from each other over time. This can cause overwritten and absent messages.

Figure 2:
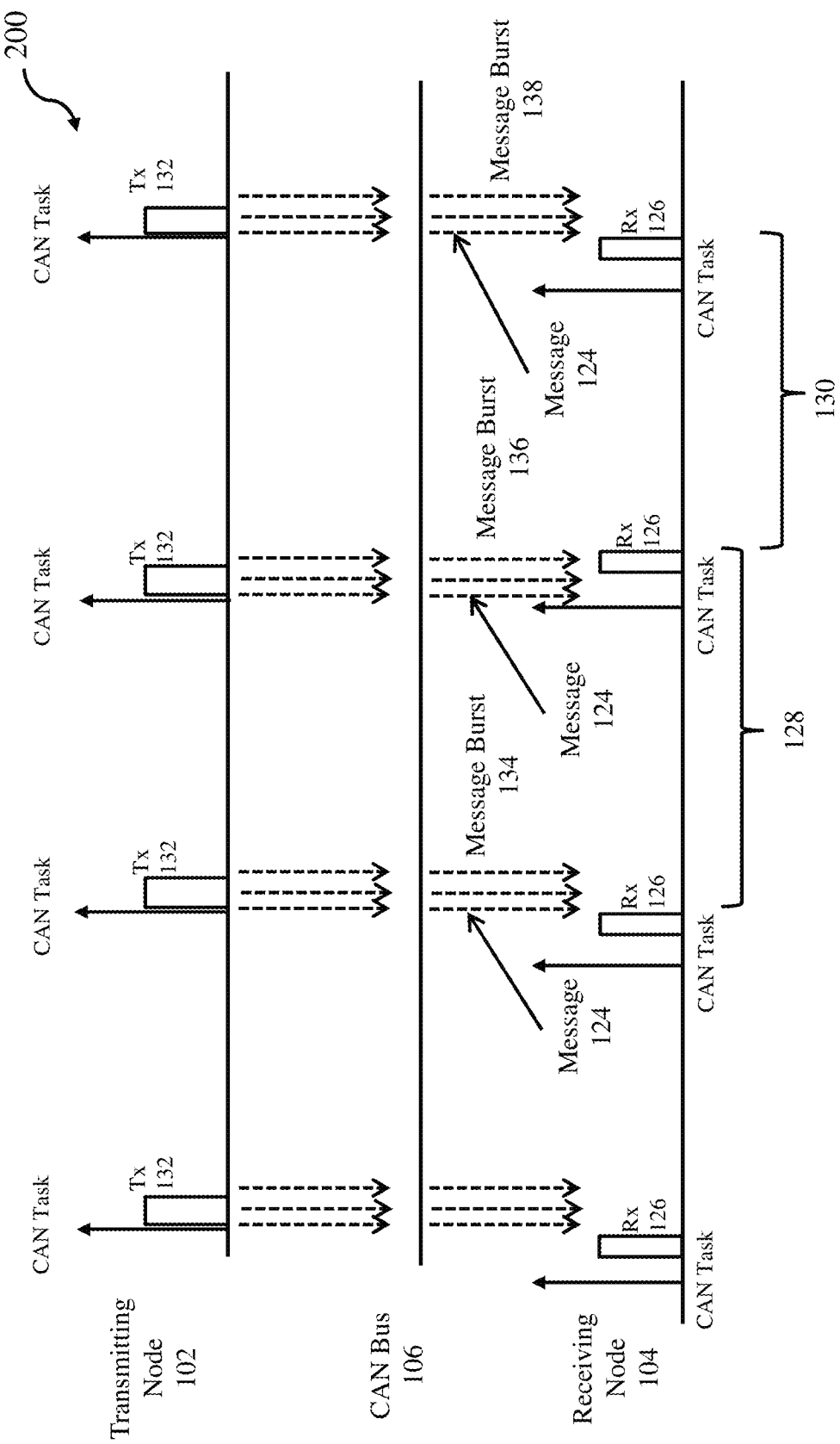
FIG. 2 depicts a diagram of a conventional CAN where overwritten and absent messages occur according to one embodiment.

FIG. 2 depicts a timing diagram 200 of a conventional (unsynchronized) CAN to show overwritten and absent messages, according to one embodiment. For the sake of simplicity and brevity, the figure focuses on the CAN Tx on node 102 and the CAN Rx on node 104. Sequence 128 is an example of how CAN timing jitter and lack of synchronization may cause message 124 in message burst 134 and message 124 in message burst 136 from the transmitting node to be overwritten before Rx node 104 is able to unpack message 124 from message burst 134. Sequence 130 is an example of how CAN timing jitter and lack of synchronization may cause an absent message where none of message 124 in message burst 136 and message 124 in message burst 138 from the transmitting node is in a Rx message box. When CAN Rx procedure 126 unpacks the received messages, it finds out that Rx node 104 receives no new message for message 124.

It may be desirable to provide a CAN node synchronization function configured to periodically transmit a synchronization CAN message and CAN message(s) with Tx target time allocations from a node to all the remaining nodes, whereby all the remaining nodes transmit CAN messages with their burst durations to this node for calculations of Tx target times and synchronize their Tx times with their Tx target times in such a way that message bursts from all the nodes on the CAN bus are evenly time spaced to enable application-level node-to-node deterministic data communication.

Figure 3:
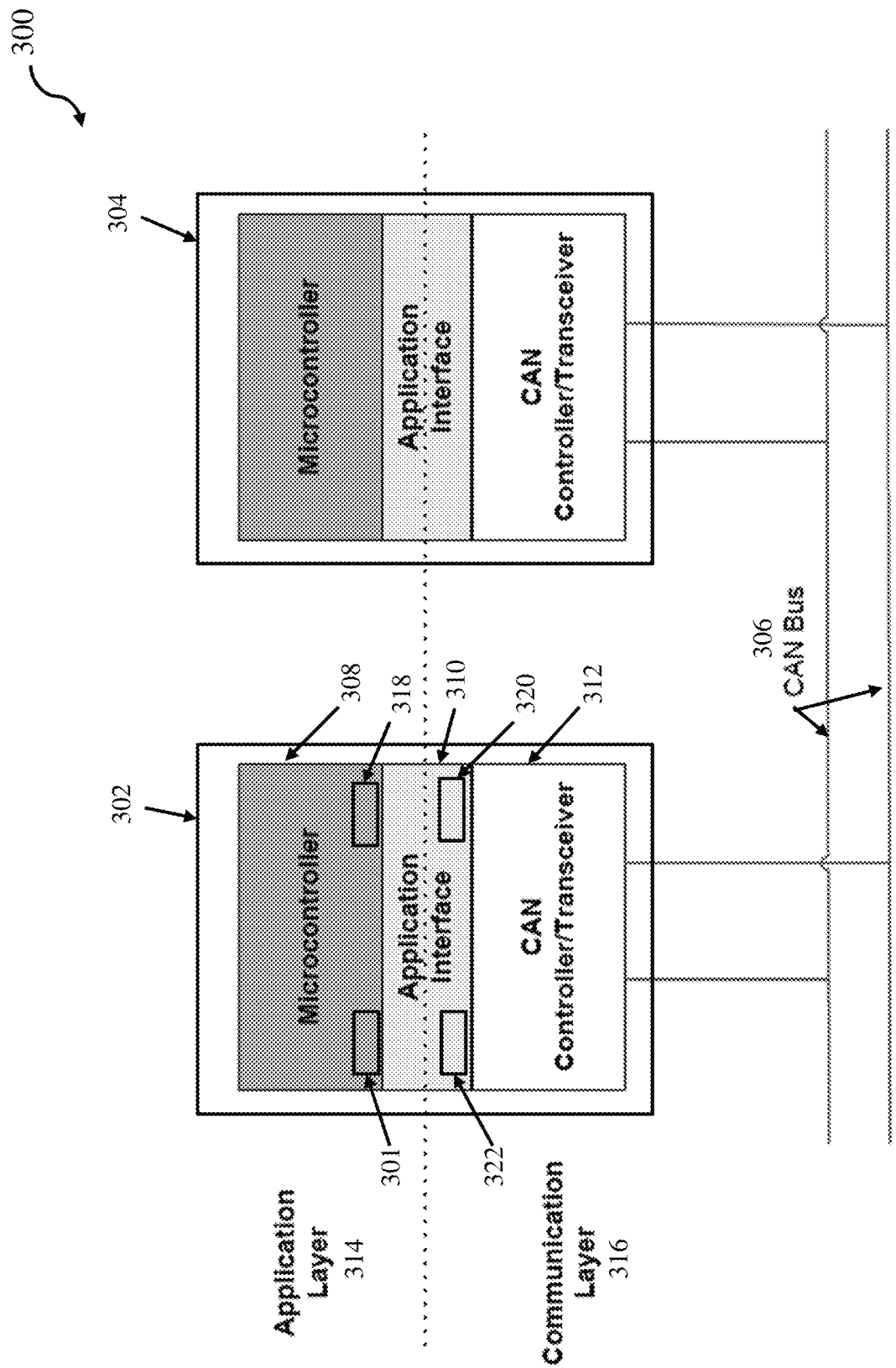
FIG. 3 depicts a block diagram with a CAN node synchronization function according to one embodiment.

FIG. 3 depicts a CAN configured with a CAN node synchronization function 301 (the CAN and synchronization function collectively referred to hereafter as "system 300"), according to one embodiment. System 300 may include a plurality of nodes including, for example, nodes 302 and 304. It is appreciated that system 300 may include more than two nodes.

A CAN node includes a communication layer 316 and an application layer 314, which separate, for each node in system 300, a microcontroller 308 and a CAN controller/transceiver 312 via an application interface 310. Communication layer 316 may be configured to provide CAN protocol services. Application layer 314 supplies/consumes data to/from communication layer 316. Application interface 310 may facilitate data transfer between microcontroller 308 and CAN controller/transceiver 312. A CAN node (e.g., sync master node 302) includes a microcontroller 308, an application interface 310, and a CAN controller/transceiver 312. Microcontroller 308 may include a CAN application task 318. Application interface 310 may include one or more CAN Rx message boxes 322, and one or more Tx message boxes 320. Synchronization function 301 may be configured on each node in system 300.

According to some embodiments, system 300 may be configured to select a node in the network via the microcontroller (e.g., microcontroller 308) to serve as the synchronization master node. In the present example, network 300 has selected node 302 as the sync master node (synchronization master node). Sync master node 302, can periodically send a CAN sync message (not shown) e.g., once every CAN task cycle to each of the other CAN nodes.

Each of the remaining CAN nodes on CAN bus 306 may be configured as a sync slave node (synchronization slave node). The sync slave nodes (e.g., sync slave node 304) may also be configured with a CAN node synchronization function 301. Accordingly, each sync slave node may adjust its CAN task current cycle time based on its allocated target time, relative to the point of time the sync message is received, to move the start of its CAN task cycle along with its Tx/Rx packing/unpacking procedures and consequently to move its message burst so that the message bursts are evenly time-spaced on CAN bus 306. System 300 may configure CAN nodes using synchronization function 301 to render all the CAN nodes on CAN bus 306 to be contention free to enable application-level node-to-node deterministic data communication, e.g., from CAN applications running on microcontroller 308 on a node (e.g., sync master node 302) to the CAN applications running on microcontroller (not shown) on another node (e.g., sync slave node 304).

In some embodiments, the packing and unpacking procedures running on microcontroller 308 are all in one CAN application task 318. In CAN application task 318, the message packing procedure for Tx may run before the message unpacking procedure for Rx.

Figure 4:
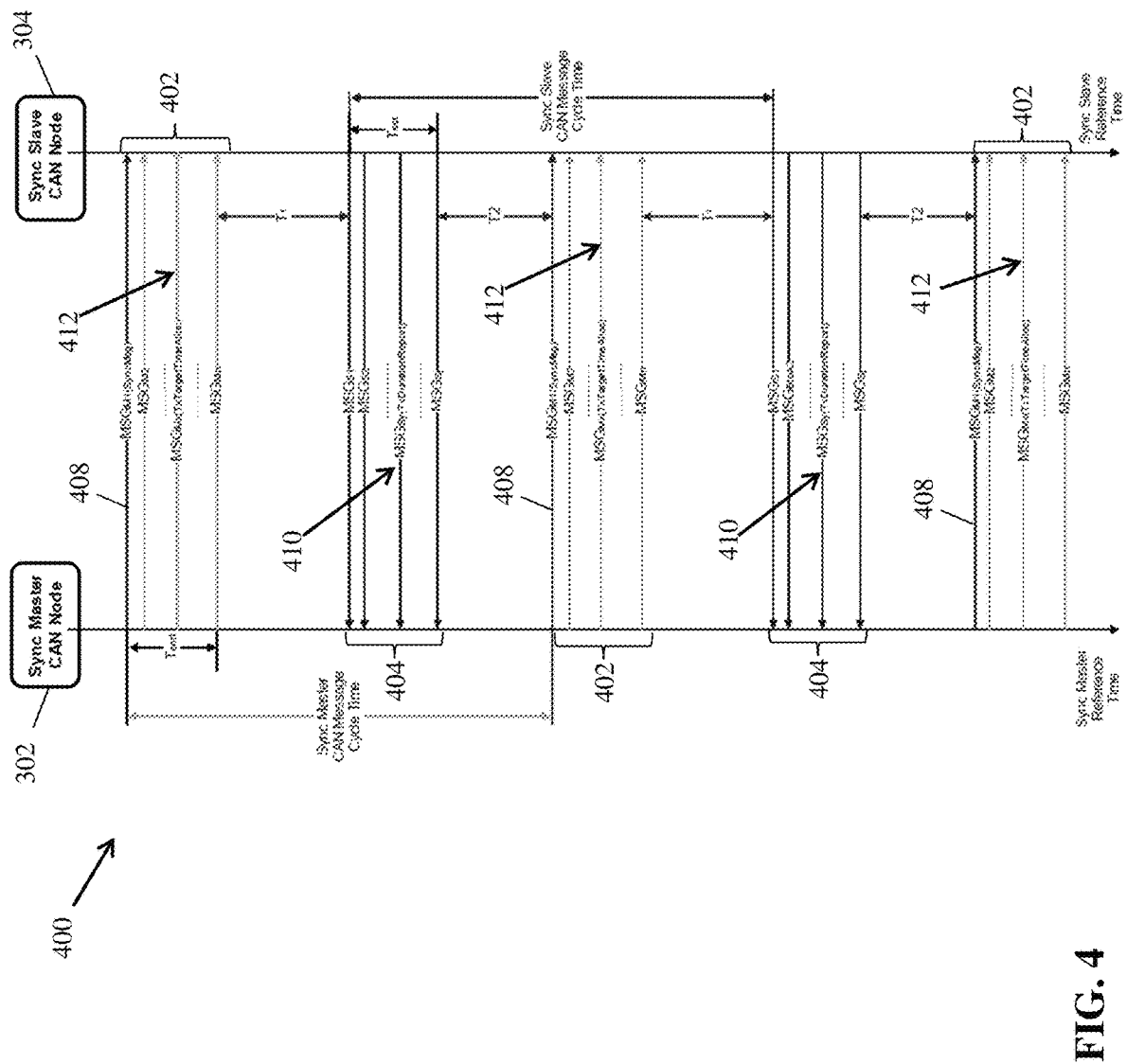
FIG. 4 depicts a diagram of message bursts in a synchronized CAN according to one embodiment.

Referring now to FIG. 4, a diagram 400 of message bursts 402 and 404 in CAN node synchronization system 300 is depicted, according to one embodiment. For the sake of brevity, only two nodes (sync master node 302 and sync slave node 304) are shown, although system 300 may include multiple sync slave nodes 304. To produce even time spacing between message bursts on CAN bus 306, system 300 may configure one node to be the sync master node (shown in FIG. 4, for example, as sync master node 302), and configure the remaining node(s) in the network to be the sync slave node(s) (shown in FIG. 4, for example, as sync slave node 304).

For optimal operation, the point of time of transmitting a sync message 408 from sync master node 302, and consequently the point of time of receiving sync message 408 on sync slave node 304, may be made as accurate as possible. Therefore, sync message 408 may be the first message of its respective message burst 402 sent out from sync master node 302 to avoid the scenario that the message(s) queued before the sync message from the sync master node may need retransmission due to CAN bus contention which makes the sync message transmission start/end time inaccurate on CAN bus 306. Secondly, microcontroller 308 may assign sync message 408 with the lowest message ID among the messages transmitted from all the nodes on CAN bus 306 so that sync message 408 may have the highest priority on CAN bus 306 to always win the bus in case of bus transmission contention from the other nodes (e.g., sync slave node 304, etc.). Thirdly, an interrupt may be triggered on microcontroller 308 when the sync message is received and ready in a Rx message box 322 on sync slave node 304, and as an option a time adjustment may be performed by microcontroller 308 on sync slave node 304 immediately, e.g., in the context of interrupt service routine in 301. A microcontroller in a CAN node can be configured to trigger interrupts at receiving one or more messages among all the Rx messages. The microcontroller 308 may be configured to trigger an interrupt at receiving the sync message on the sync slave node.

In FIG. 4, $T_{smt}$ represents a message burst transmission duration from sync master node 302 and $T_{sst}$ represents a message burst transmission duration from sync slave node 304 in a two node CAN system. $T_1$ represents the spacing time between the end of a message burst from the sync master node 302 and the start of the following message burst from the sync slave node 304. $T_2$ represents the spacing time between the end of a message burst from the sync slave node 304 and the start of the following message burst from the sync master node 302. According to some embodiments, system 300 may dynamically adjust the start of message bursts 404 from the sync slave node 304 once per CAN application task cycle to make the message bursts from the sync slave node 304 synchronize with message bursts from sync master node 302 in such a way that the values of $T_1$ and $T_2$ stay equal within a predetermined threshold of error. A predetermined threshold of error may be, for example, 100 microseconds.

In one or more non-limiting embodiments, the message burst transmission duration ($T_{sst}$) associated with a slave node 304 is predetermined data and is set when manufacturing of the slave node 304. Shown in FIG. 4, each slave node uses its transmission duration report CAN message 410 to send its burst duration to the master node. The master node 302 calculates the message burst spacing time $T_{spacing}$ and message burst transmission target times, such as $T_{TXtarget}$ unique to each slave node, and uses transmission target time allocation CAN message(s) 412 to send transmission target times to the slave nodes (e.g., slave node 304), as described in greater detail below.

The preconfigured data (e.g., a given slave node's message burst transmission duration) may be used at the CAN node communication startup. In at least one example, the master node 302 may calculate time spacing and the slave node transmission target times using the preconfigured message burst transmission duration $T_{sst}$ for a given slave node (e.g., slave node 304) before receiving it from the slave node. In some examples the slave node 304 may use its preconfigured Tx target time before receiving it from the master node 302. In some instances, the preconfigured data may be out of date, or may even have never changed from its first time configuration on the sync master node. The preconfigured data use is to make the network synchronization startup more smoothly, which lasts for a very short period of time. When the Tx duration report message 410 from a slave node (e.g., slave node 304) is received, the master node 302 will include the received Tx duration to calculate the time spacing and the slave node Tx target times. When the Tx target time allocation CAN message 412 is received, the slave node 304 will use the received Tx target time to adjust its CAN task current cycle time.

Figure 5:
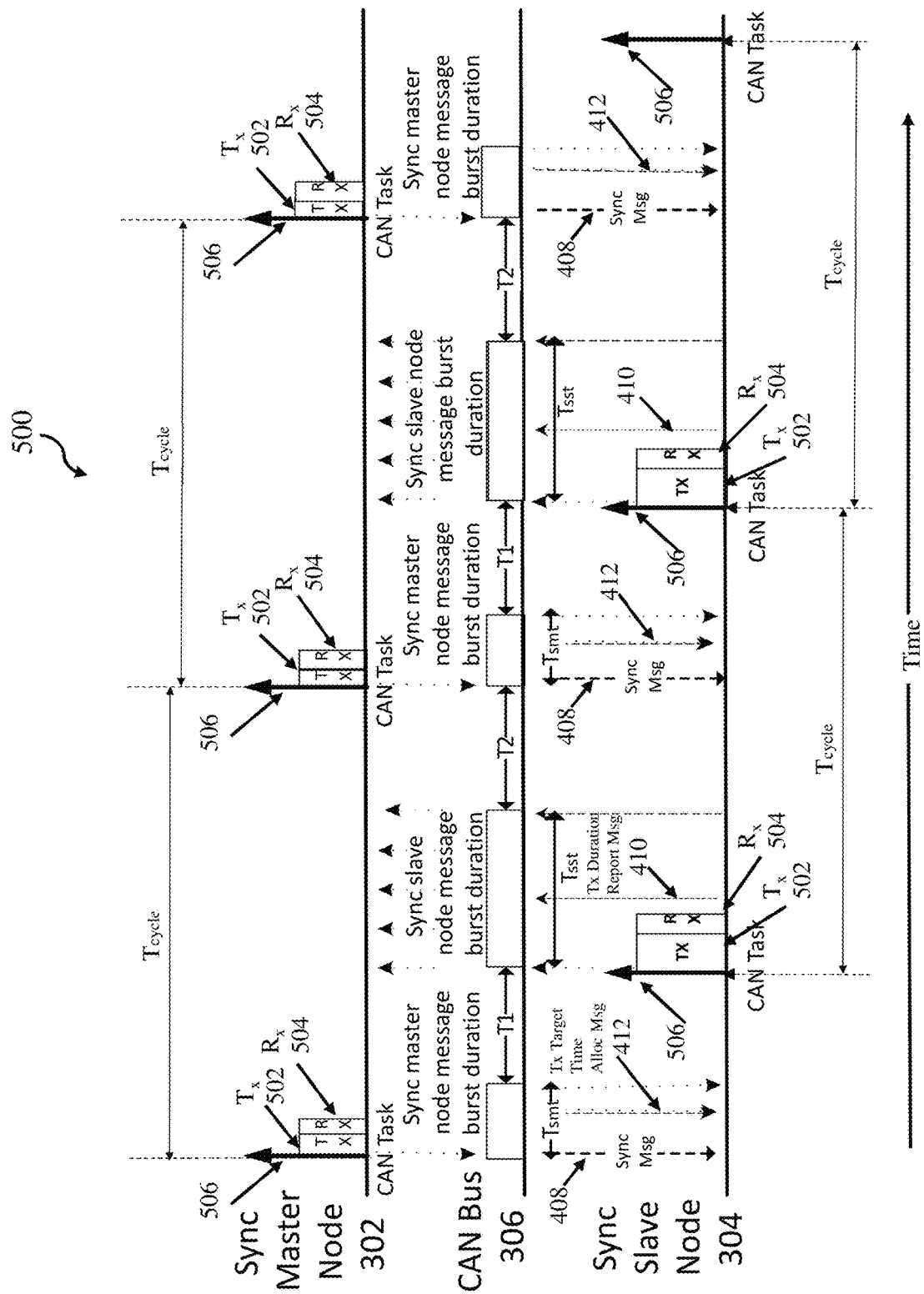
FIG. 5 depicts a timing diagram of CAN task periodic cycles, CAN task transmission and receiving procedures on the sync master and sync slave nodes, and message bursts on CAN bus according to one embodiment.

FIG. 5 depicts a two node CAN timing diagram 500 of CAN task periodic cycles on the sync master and sync slave nodes, CAN task procedures of packing for Tx and unpacking for Rx and message bursts on a CAN bus according to one embodiment. Referring now to FIG. 5, Tx procedure 502 and Rx procedure 504 are depicted next to each other. Tx procedure 502 is followed by Rx procedure 504 on both sync master node 302 and sync slave nodes 304. Tx procedure 502 and Rx procedure 504 may be configured by microcontroller 308 as the early procedures among all the possible procedures in the CAN task in system 300. In some aspects, making CAN tasks Tx procedure 502 and Rx procedure 504 the early procedures in CAN task on sync master node 302 and sync slave nodes 304 may minimize jitters that may otherwise be caused by the procedures prior to the Tx/Rx procedures.

As shown in FIG. 5, sync message 408 may be the first message in the periodic message burst 402 from sync master node 302. The start of the message burst on CAN bus 306 from either sync master node 302 or sync slave node 304 is tied to the start of a Tx procedure 502 in CAN task by a small amount of time, from packing of the first message by microcontroller 308 to start of transmitting the message by CAN controller/transceiver 312. Thus, microcontroller 308 may adjust the start of a CAN task cycle 506 on the sync slave node to move the start of the message burst from the sync slave node. Since Tx procedures 502 in the CAN task for both sync master node 302 and sync slave node 304 only take a fraction of the node message burst period, there is enough time to finish Rx procedure 504 to unpack all the newly received messages before the message burst from the next node starts, when equal time-spaced message bursts are achieved on CAN bus 306. It is critical for Rx procedures 504 to finish on a node before the message burst from the next node starts. Otherwise, a race condition between the Rx procedure on a node and a message transmission from the next node may cause an overwritten message if transmission from another node wins the race or an absent message if the Rx procedure on the node wins the race, as illustrated in sequences 128 and 130 in FIG. 2.

The system 300 operates to perform a CAN node synchronization according to various non-limiting embodiments. For example, the system 300 may identify a node as a sync master node 302 and may designate each of the remaining nodes as a sync slave node 304.

The microcontroller 308 in the system 300 may designate the first message from sync master node 302 as a sync message 408, and assign a message ID to the sync message that is the lowest message ID from a plurality of messages in all the message bursts 402 and 404.

The microcontroller 308 may determine an optimized spacing time duration $T_{spacing}$ between neighbor message bursts 402 and 404. As shown in FIG. 5, the following equation holds for a two node CAN:

$$T_{cycle}=T_{smt}+T_1+T_{sst}+T_2; \quad (1)$$

where $T_{cycle}$ is a transmission cycle duration equal and tied to the predetermined CAN task cycle time, $T_{smt}$ is the sync master message burst transmission duration, and $T_{sst}$ is the sync slave message burst transmission duration.

According to some embodiments, a CAN analyzer and/or an oscilloscope may provide measurements for the master message burst transmission duration $T_{smt}$, sync message transmission duration $T_{st}$ (time elapse from the first bit to the end bit of the sync message transmitted on CAN Bus), and the sync slave message burst transmission duration $T_{sst}$. Thus, $T_{smt}$ and $T_{st}$ are predetermined measurements and configured in the master node, and $T_{sst}$ is predetermined measurements and configured in the slave node. When performing the CAN task Tx procedure, the slave node 304 packs $T_{sst}$ to its Tx duration report CAN message 410 and transmits the message to the master node 302. At receiving the Tx duration report message from the slave node, the master node 302 CAN task Rx procedure unpacks the message and saves $T_{sst}$ for calculating the slave node Tx target time.

In FIG. 5, $T_1$ represents the spacing time between the end of a message burst from sync master node 302 and the start of the following message burst from sync slave node 304. $T_2$ represents the spacing time between the end of a message burst from sync slave node 304 and the start of the following message burst from sync master node 302. When $T_1$ is about equal to $T_2$, the (message burst from) sync master node 302 and the (message burst from) sync slave node 304 are optimally synchronized. Thus, replace $T_1$ and $T_2$ with $T_{spacing}$ in equation (1), $T_{spacing}$ for a two-node CAN may be derived by:

$$T_{spacing}=(T_{cycle}-(T_{smt}+T_{sst}))/2; \quad (2)$$

In at least one non-limiting embodiment, a sync message receiving time ($T_{syncMsgRx}$) on a slave node (the same as sync message transmission end time from the master node) is used as a common time reference point from which the message burst transmission target time allocated from the master node and the message burst transmission time on a slave node are measured. A slave node message burst transmission time, referred to as $T_{TX}$, is defined as time elapse from the time point the sync message is received on the slave node to the start of its next message burst transmission. As shown in FIG. 5, a slave node next message burst transmission time relative to the sync message receiving time on the slave node is equal to the master node message burst transmission duration $T_{smt}$ minus the sync message transmission duration $T_{st}$ (i.e., $T_{smt}-T_{st}$), for the accuracy of transmission target times calculation, plus $T_1$. When $T_1$ is equal to $T_{spacing}$, the master message bursts and the slave message bursts are evenly distributed on the CAN Bus 306, and $T_{TX}$ becomes optimal, referenced as $T_{TXtarget}$. Thus, $T_{TXtarget}$ may be derived by:

$$T_{TXtarget}=T_{smt}+T_{spacing}; \quad (3)$$

When performing the CAN task Tx procedure, the master node can pack $T_{TXtarget}$ to the transmission target allocation CAN message 412 and add it to the transmission message box/buffer 120. Accordingly, system 300 may be configured with $T_{cycle}$ as a transmission cycle duration equal and tied to the predefined CAN task cycle time by design, $T_{smt}$ and $T_{st}$ as predetermined known time measurements, $T_{sst}$ received from the slave node, and $T_{spacing}$ and $T_{TXtarget}$ as derived values from $T_{cycle}$, $T_{smt}$, $T_{st}$ and $T_{sst}$.

A synchronization function 301 on a sync slave node can be configured to receive the message burst transmission target time allocation CAN message with $T_{TXtarget}$ 412 from the master node 302. The synchronization function may also be configured to trigger an interrupt to microcontroller 308 on sync slave node 304 upon receiving sync message 408 on sync slave node 304. Accordingly, synchronization function 301 may use the interrupt service routine to retrieve the sync message receiving time $T_{syncMsgRx}$ relative to the CAN task current cycle start time. As shown in FIG. 5, as per its definition, $T_{TX}$ in the slave node can be derived by:

$$T_{TX} = (T_{cycle} - T_{syncMsgRx}) \quad (4)$$

The slave node 304 can then compare the $T_{TX}$ to $T_{TXtarget}$. Based on the comparison, the timing of the next message burst transmission time can be determined with respect to its target time, the slave node determines how to perform a time adjustment. $T_{adjust}$ represents the amount of time the slave node CAN task current cycle time may be adjusted by.

For example, when $T_{TX}$ is smaller than $T_{TXtarget}$, then the next message burst transmission would occur before its target time, so its CAN task current cycle time can be increased by $T_{adjust}$ to make the CAN task next cycle start time occur later by $T_{adjust}$ and consequently move the next message burst transmission time closer to its target by $T_{adjust}$.

Otherwise, when $T_{TX}$ is greater than $T_{TXtarget}$, then the next message burst transmission would occur after its transmission target time, so its CAN task current cycle time can be decreased by $T_{adjust}$ to make the CAN task next cycle start time occur earlier by $T_{adjust}$ and consequently move the next message burst transmission time closer to its target time by $T_{adjust}$.

This is a dynamic time adjustment process that occurs typically once every CAN task cycle in order to align the message burst transmission time on the slave node to its transmission target time by a very small time range. $T_{adjust}$ may be defined as a fixed small number, e.g., Tcycle/100. For example, for 5 millisecond CAN task cycle, $T_{adjust}$ may be set to 50 microseconds to synchronize the sync slave node 304 with the sync master node 302 in less than 500 milliseconds, half second. Alternatively, $T_{adjust}$ may be utilized as a variable so that when the message burst transmission time is far away from its target time, which usually happens at the startup of the CAN network, $T_{adjust}$ may be set to several times of Tcycle/100 to expedite the synchronization yet not to disturb the CAN task and other application procedures. In one or more embodiments, for fine time adjustment, $T_{adjust}$ may be set to a small value e.g., $T_{cycle}/100$ or even smaller when the message burst transmission time is close to its target time.

Figure 6:
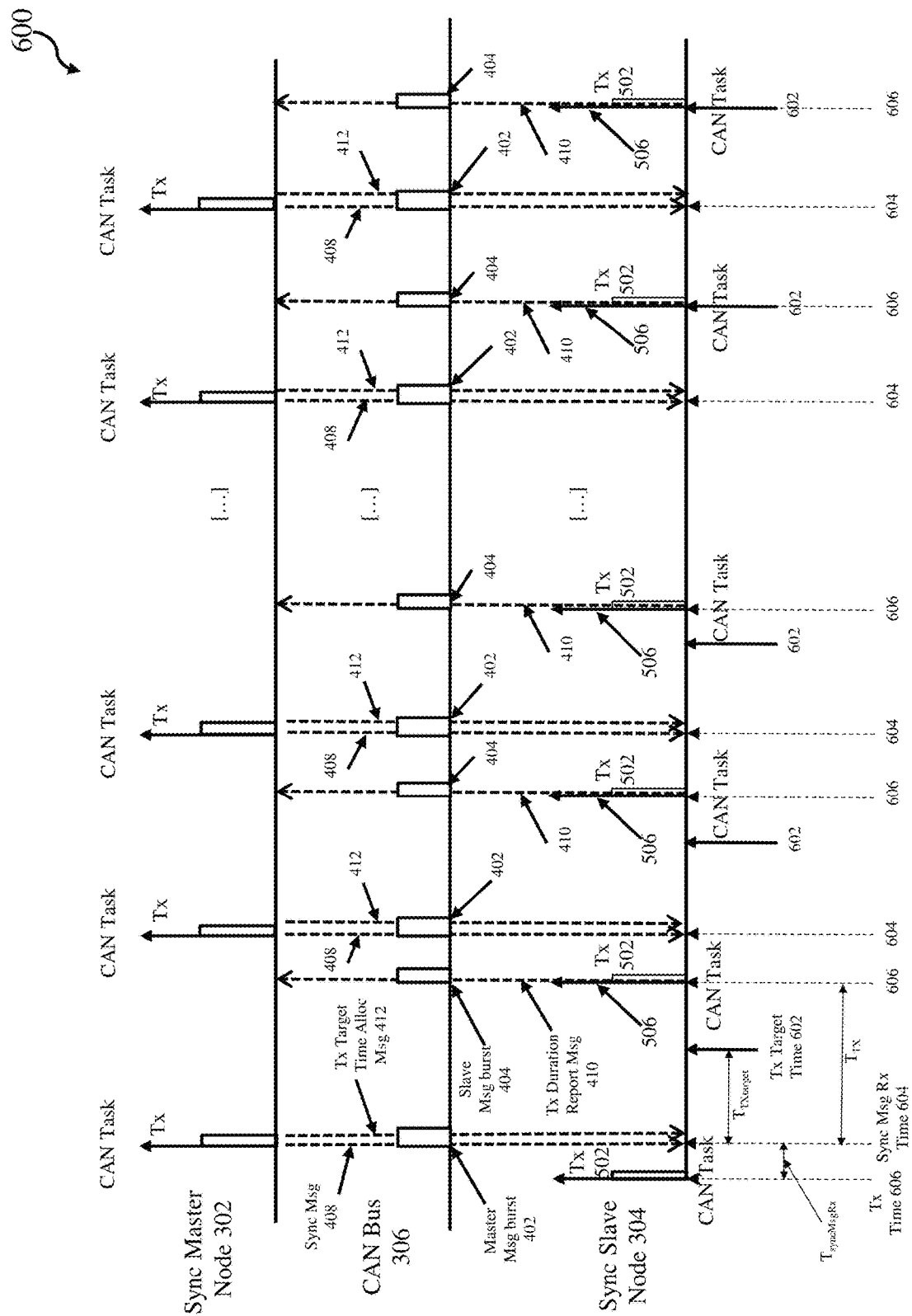
FIG. 6 depicts a diagram of CAN task cycle time adjustment in a two node CAN synchronization system according to one embodiment.

FIG. 6 depicts a diagram 600 of CAN task cycle time adjustment on the sync slave node for a two node CAN synchronization system 300, according to one embodiment. The slave node 304 transmits its message burst transmission duration report CAN message 410 with $T_{sst}$ to the master node 302. The master node 302 gets $T_{sst}$ from this slave node transmission duration report CAN message 410, and uses the $T_{sst}$, and predetermined $T_{smt}$, $T_{st}$ and $T_{cycle}$ in the master node 302 to calculate the slave node transmission target time $T_{TXtarget}$ 602. The master node 302 transmits the transmission target time allocation CAN message 412 with $T_{TXtarget}$ 602 as well as the sync message 408 to the slave node 304.

The slave node 304 gets $T_{TXtarget}$ 602 from the transmission target time allocation CAN message 412. To get the sync message receiving time $T_{syncMsgRx}$ 604 relative to the CAN task current cycle start time 506, the slave node 304 is configured to trigger an interrupt at receiving the sync message 408 from the master node 302. The slave node 304 may perform the time adjustment either in the context of this interrupt or right after the Rx procedure, based on $T_{TXtarget}$ 602 received from the master node 302 and its transmission time in its CAN task next cycle $T_{TX}$ 606 derived from sync message receiving time $T_{syncMsgRx}$ 604 and preconfigured CAN task cycle time $T_{cycle}$. For example, CAN task cycle start time 506 on the sync slave node 304 may be adjusted by decreasing the CAN task current cycle time with a predefined time adjustment each cycle. Thus, the microcontroller on sync slave node 304 may move the start of the CAN task cycle time 506 along with its transmission time $T_{TX}$ 606 closer to its transmission target time 602, and over time the actual transmission time $T_{TX}$ 606 eventually converges with the transmission target time $T_{TXtarget}$ 602 on sync slave node 304. When the transmission time $T_{TX}$ 606 on the sync slave node moves close to its target transmission time 602, the message bursts 404 from sync slave node 304 is moving to the middle between its two neighbor sync master message bursts 402. The message bursts on CAN bus 306 are eventually evenly time spaced when transmission time $T_{TX}$ 606 and its target transmission time $T_{TXtarget}$ 602 converge.

The scheme described above can be extended to a CAN network with more than two nodes. A three node system, for example, is described below. Assume the message burst order is as follows: master node; slave node 1; slave node 2. In this example, $T_{smt}$, $T_{sst1}$ and $T_{sst2}$ represent the message burst transmission duration on the master node, slave node 1, and the slave node 2, respectively. Slave node 1 and slave node 2 use their transmission duration report CAN messages to send $T_{sst1}$ and $T_{sst2}$ to the master node. The master node calculates message bursts spacing time and slave node transmission target times: the message bursts spacing time $T_{spacing}$ is set to $(T_{cycle} + (T_{smt} + T_{sst1} + T_{sst2}))/3$; the transmission target time relative to the sync message receiving time for slave node 1 $T_{TXtarget1}$ is set to $T_{smt\text{-}} + T_{spacing}$; the transmission target time relative to the sync message receiving time for sync slave node 2. $T_{TXtarget2}$ is set to $T_{smt\text{-}} + T_{sst1} + 2*T_{spacing}$. $T_{smt\text{-}}$ represents the master node message burst transmission duration $T_{smt}$ minus the sync message transmission duration $T_{st}$. Accordingly, the sync master node 302 can use transmission target time allocation CAN message(s) to send $T_{TXtarget1}$ to slave node 1 and $T_{TXtarget2}$ to slave node 2. The time adjustment procedures on each slave node can be the same as those illustrated for the two node CAN system.

For an N node CAN network, one node may be configured as the sync master node, and the remaining nodes may be configured as sync slave node 1, sync slave node 2, . . . , sync slave node N−2, and sync slave node N−1. The order of message bursts on the CAN bus may be assigned as message bursts from the sync master node, sync slave node 1, sync slave node 2, . . . , sync slave node N−2, and sync slave node N−1. The optimal neighbor message bursts spacing time $T_{spacing}$ may be derived by:

$$T_{spacing} = (T_{cycle} - (T_{smt} + T_{sst1} + T_{sst2} + \ldots + T_{sstN-2} + T_{sstN-1}))/N; \quad (5)$$

where $T_{cycle}$ is a transmission cycle duration equal and tied to the predefined CAN task cycle time, $T_{smt}$ is the sync master node message burst duration, $T_{sst1}$ is the sync slave node 1 message burst duration, $T_{sst2}$ is the sync slave node 2 message burst duration, $T_{sstN-2}$ is the sync slave node N-2 message burst duration, and $T_{sstN-1}$ is the sync slave node N-1 message burst duration.

According to some embodiments, a CAN analyzer and/or an oscilloscope may provide measurements for the sync master message burst duration $T_{smt}$ and all the sync slave message burst durations $T_{sst1}$, $T_{sst2}$, $T_{sstN-2}$, ..., and $T_{sstN-1}$, etc. The maximum message burst duration from a node may be taken as its measured burst duration. This may accommodate CAN nodes that transmit messages of different periods and even aperiodic messages. Thus, a measured burst duration for a node may be considered as the maximum CAN bus bandwidth allocation for the node, and $T_{spacing}$ may be considered as the optimal spacing time between the CAN bus bandwidth allocations for any neighbor message bursts. The $T_{TXtarget}$ for slave nodes (slave node 1; slave node 2; ... ; slave node N-2; and slave node N-1) can be derived as follows:

$T_{TXtarget1}$ for slave node 1 is set to $T_{smt-}+T_{spacing}$;

$T_{TXtarget2}$ for slave node 2 is set to $T_{smt-}+T_{sst1}+2*T_{spacing}$;

$T_{TXtargetj}$ for slave node $j$ is set to $(T_{smt-}+T_{sst1}+\ldots+T_{sst-1})+j*T_{spacing}$;

$T_{TXtargetN-2}$ for slave node N-2 is set to $(T_{smt-}+T_{sst1}+T_{sst2}+\ldots+T_{sstN-3})+(N-2)*T_{spacing}$; and $T_{TXtargetN-1}$ for slave node N-1 is set to $(T_{smt-}+T_{sst1}+T_{sst2}+\ldots+T_{sstN-2})+(N-1)*T_{spacing}$.

As described above, $T_{smt-}$ represents the master node message burst transmission duration $T_{smt}$ minus the sync message transmission duration $T_{st}$. Slave nodes use their message burst transmission duration report CAN messages to send their message burst transmission durations, such as $T_{sst1}$ and $T_{sst2}$, ..., $T_{sstN-2}$, $T_{sstN-1}$, etc., to the master node. The master node calculates the message bursts spacing time and message burst transmission target times, such as $T_{TXtarget1}$, $T_{TXtarget2}$, $T_{TXtargetN-2}$, $T_{TXtargetN-1}$, etc., as shown above, and use transmission target time allocation CAN message(s) to send transmission target times to the slave nodes. As described above, time adjustment procedures on each slave node can be the same as those illustrated for the two node CAN system.

In one or more embodiments, the message burst order for N node CAN network is master node, slave node 1, slave node 2, slave 3 ... slave node N-2 and slave node N-1. A unique ID may be assigned to each of the slave nodes. For instance, 1 may be assigned to slave node 1 ID, 2 to slave node 2 ID, ... (N-2) to slave node N-2 ID, and (N-1) to slave node N-1 ID.

Figure 7:
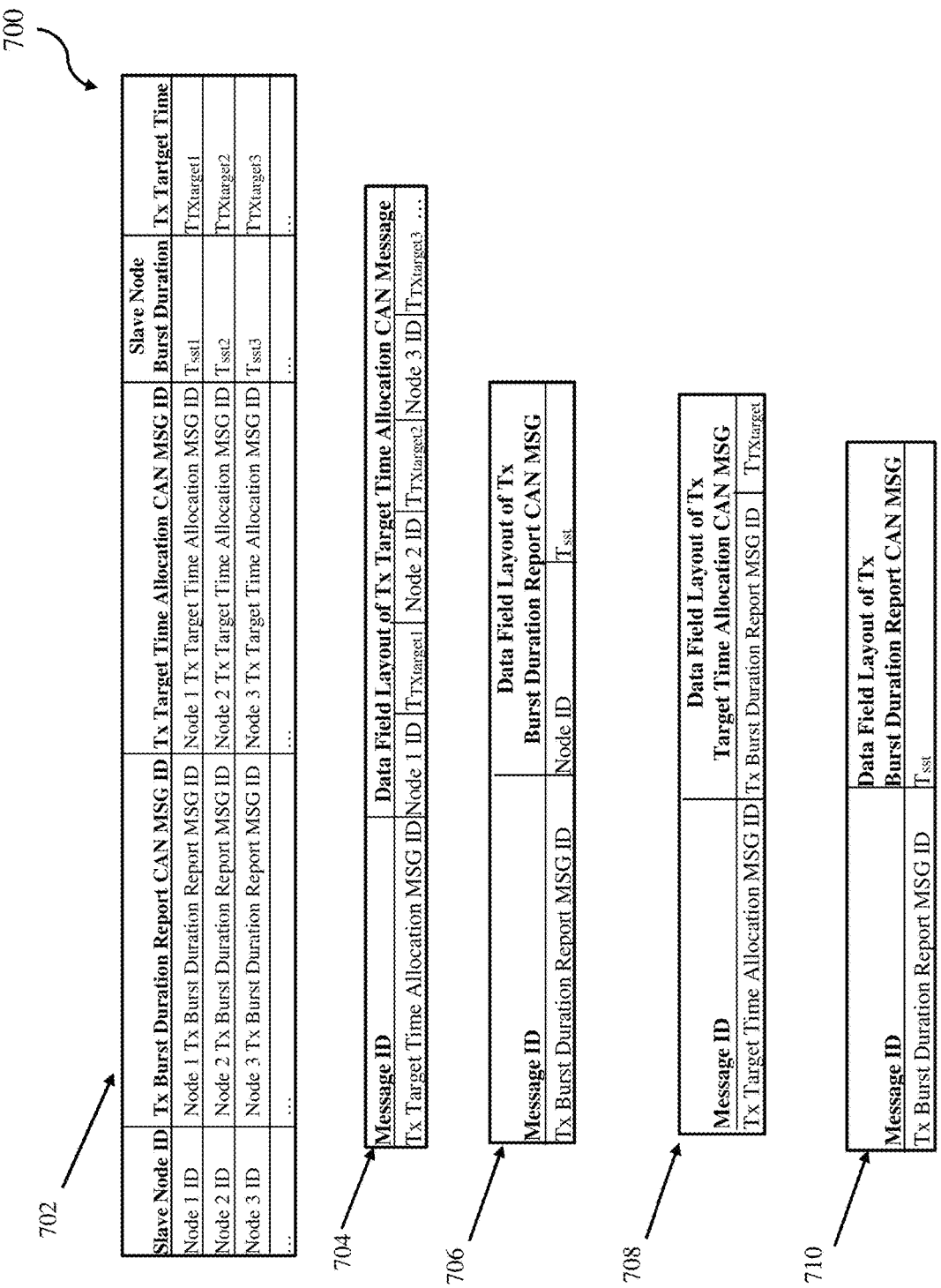
FIG. 7 depicts data structures used in the sync master and slave nodes according to one embodiment.

Turning to FIG. 7, data structures 700 used in the sync master and slave nodes are illustrated according to a non-limiting embodiment. FIG. 7 illustrates a common data structure that may be used by the sync maser and slave nodes to fill or decode the message ID and the data fields in the transmission duration report and transmission target time allocation CAN messages. In one or more embodiments, a data structure of five fields may be introduced. The five fields are: predefined unique slave node ID, predefined unique Tx duration report message ID from the slave node, predefined Tx Target Time Allocation Message ID from the master node, the slave node Tx burst duration, and the slave node Tx Target Time.

A list 702 of the common data structure may be created on the master node, with each entry dedicated to a specific slave node on the network. When the master node receives a Tx burst duration report message, it locates an entry in the list 702 that matches the message ID and the slave node ID from the Tx burst duration report message, and fills the Tx burst duration field of that entry using the $T_{sst}$ received from the report message. Later, the master node fills the Tx target time field of that entry using $T_{TXtarget}$ calculated for that slave node. In one or more embodiments, there may be multiple Tx target time allocation message IDs in the list 702 in the master node, each of which may be used to allocate Tx target times to a group of the slave nodes. In one or more embodiments, there may be just one Tx target time allocation message ID (the value settings of this field throughout the list 702 are the same) in the list 702 in the master node, which may be used to allocate Tx target times to all the slave nodes.

In one or more embodiments, one or multiple pairs of slave node ID and its transmission target time 704 from one or multiple entries of the list 702 may be filled in the data field of the transmission target time allocation CAN message to communicate the transmission target times from the master node to the slave nodes.

Accordingly, a slave node may have an instance of the common data structure used in the list 702. The instance is the image of its corresponding entry in the list 702 in the master node. Just like its corresponding entry in the list 702 in the master node, the slave node ID, the Tx burst duration report message ID and the Tx target time allocation message ID with an instance in a slave node are all predefined with the value settings the same as those in the corresponding entry of the list 702 in the master node and configured in the slave node. There are two differences between the instance in the slave and its corresponding entry in the list 702 in the master node.

One difference is the Tx burst duration field in the slave node is a measured $T_{sst}$ and configured in the slave node, while the Tx burst duration field in the master node is a $T_{sst}$ to be received in the Tx burst duration report message from the slave node. Similarly, the other difference is the Tx target time field in the slave node is a $T_{TXtarget}$ to be received in the Tx target time allocation message from the master node, while the Tx target time field in the master node is a $T_{TXtarget}$ to be calculated by the master node. Thus, the slave node may know the message ID and node ID to use to fill the message ID field and the data field 706 of the Tx burst duration report CAN message, and the message ID and node ID 704 to use to decode the Tx target time in the transmission target time allocation message received from the master node.

Alternatively, in one embodiment, only Tx burst duration $T_{sst}$ may be filled in data field 710 of the Tx burst duration report CAN message, and a pair of message ID used for transmission duration report and transmission target time $T_{TXtarget}$ 708 may be filled in data field of the transmission target time allocation CAN message. The transmission duration report message ID would be used as the key for a slave node and the master node to exchange Tx burst duration and Tx target time. No node ID would be filled in these messages, which would lose the more robust sanity check from the node ID cross reference in the handshake messages.

In some embodiments, one or multiple pairs of slave node ID and transmission target time can be filled in one transmission target time allocation CAN message to allocate transmission target times to multiple slave nodes. Multiple transmission target time allocation CAN messages of different message IDs may be sent from the master node per CAN task cycle.

To save CAN bus bandwidth, one transmission target time allocation CAN message per CAN task cycle may be used. Accordingly the transmission target time allocation CAN message may also be used as the sync message, the first message in the master node message burst. It may take multiple CAN cycles for the master node to finish one round of allocating the transmission target times to all the slave nodes.

In at least one embodiment, depending on the CAN task cycle time, a microsecond, 10 microseconds, one or several thousandth(s)/hundredth(s) of CAN cycle, etc., may be selected as time unit for the Tx duration in the Tx duration report CAN messages and the Tx target time in Tx target time allocation CAN message(s).

As described herein, techniques for synchronizing nodes on a controller area network (CAN) are provided to allow for convenient messages addition/deletion on the master node: after messages addition/deletion, a master node developer can measure the master node message burst transmission duration $T_{smt}$ that is to be configured into the master node. Accordingly, the duration can be used to calculate the slave node transmission target times. Although Tx target time for each slave node will be different before and after the message addition/deletion on the master node, the master node will communicate Tx target times, changed due to message addition/deletion on the master node, to all the slave nodes via Tx target time allocation CAN messages. In this case, the added/deleted messages may need to be subscribed/unsubscribed on some slave nodes, but the changes impact only the master node and no changes are required for the slave nodes in terms of network synchronization.

The techniques for synchronizing nodes on a controller area network (CAN) described herein also allow for messages addition/deletion on a slave node: after messages addition/deletion, a slave node developer can measure the slave node message burst transmission duration $T_{sst}$ that is to be configured into the slave node. Accordingly, the duration can be transmitted to the master node via burst duration report CAN message and used to calculate the slave node transmission target times. Although Tx target time for each slave node will be different before and after the message addition/deletion on the slave, the master node will communicate Tx target times, changed due to message addition/deletion on the slave node, to all the slave nodes via Tx target time allocation CAN messages. In this case, the added/deleted messages may need to be subscribed/unsubscribed on some nodes, but the changes impact only the slave node and no changes are required for the master node and the other slave nodes in terms of network synchronization.

The techniques for synchronizing nodes on a controller area network (CAN) described herein also allow for conveniently adding a slave node to a CAN network. For instance, the system may reserve some entries in the list 702 with reserved node IDs along with reserved message IDs for burst duration report and Tx target time allocation CAN messages to accommodate slave node addition. The master node may be configured to receive those reserved transmission duration report messages from future slave nodes. The developer of a new node may pick up an unused entry from the list 702, and create an image of that entry in the new node and use the node ID from that entry as its node ID, the burst duration report message ID from that entry as its burst duration report message ID, and the Tx target time allocation message ID from that entry as its Tx target time allocation message ID from the master node. The new slave node developer can measure the slave node message burst transmission duration $T_{sst}$ that is to be configured into the slave node. Accordingly, at runtime, the new slave node can transmit its $T_{sst}$ to the master node using its burst duration report CAN message. Once the master node receives the reserved transmission duration report CAN message from a slave node at runtime, the master node can increment the total number of nodes on the network by one. The master node starts including the message burst transmission duration $T_{sst}$ from the reserved transmission duration report CAN message and the new node ID from the message for calculating the transmission target times for this new node as well as all the other slave nodes on the network.

The master node also uses the transmission target time allocation message to transmit the transmission target time with the new node ID and the Tx target time allocation message ID corresponding to the new node ID from the entry in the list 702, to the new node. The transmitted messages from the new node may need to be subscribed on some nodes, but with this algorithm implemented in the master node, to add a new slave node is just local changes with the new slave node and no changes are required for the master node and all the other slave nodes in terms of network synchronization.

The techniques for synchronizing nodes on a controller area network (CAN) described herein also allow for conveniently deleting a slave node from a CAN network. For instance at the communication startup, the master node can start a timer for monitoring receiving of the transmission duration report CAN message from a slave node. If the master node has not received the transmission duration report CAN message from a slave node at the timer expiration, the master node may decide to keep the slave node when there is good margin of CAN Bus bandwidth to accommodate this node (message bursts spacing time may be used as a hint).

If the master node has not received the message burst transmission duration report CAN message from a slave node at the timer expiration, the master node may decide to mark deletion of the slave node if there is not good margin of CAN Bus bandwidth to accommodate this node, and exclude this node in calculations of total number of nodes, spacing time and slave node transmission target times. The messages from the deleted node may need to be unsubscribed on some nodes, but with this algorithm implemented in the master node, to delete a slave node does not require changes for the master node and the other slave nodes in terms of network synchronization.

Figure 8:
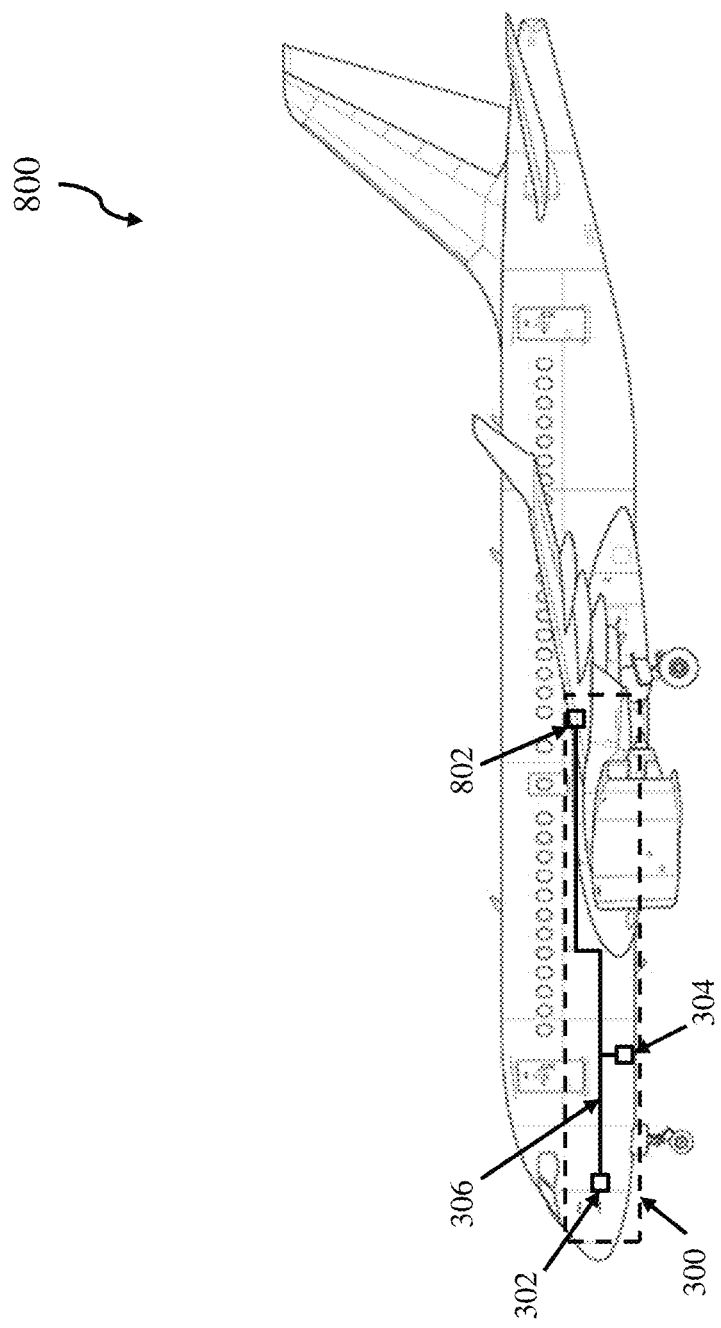
FIG. 8 depicts an aircraft having a CAN node synchronization application according to one embodiment.

FIG. 8 depicts an aircraft 800 having a CAN node synchronization system 300, according to one embodiment. Aircraft 800 may include a plurality of nodes, including, for example, sync master node 302, and a plurality of sync slave nodes 304 and 802, etc.

Figure 9:
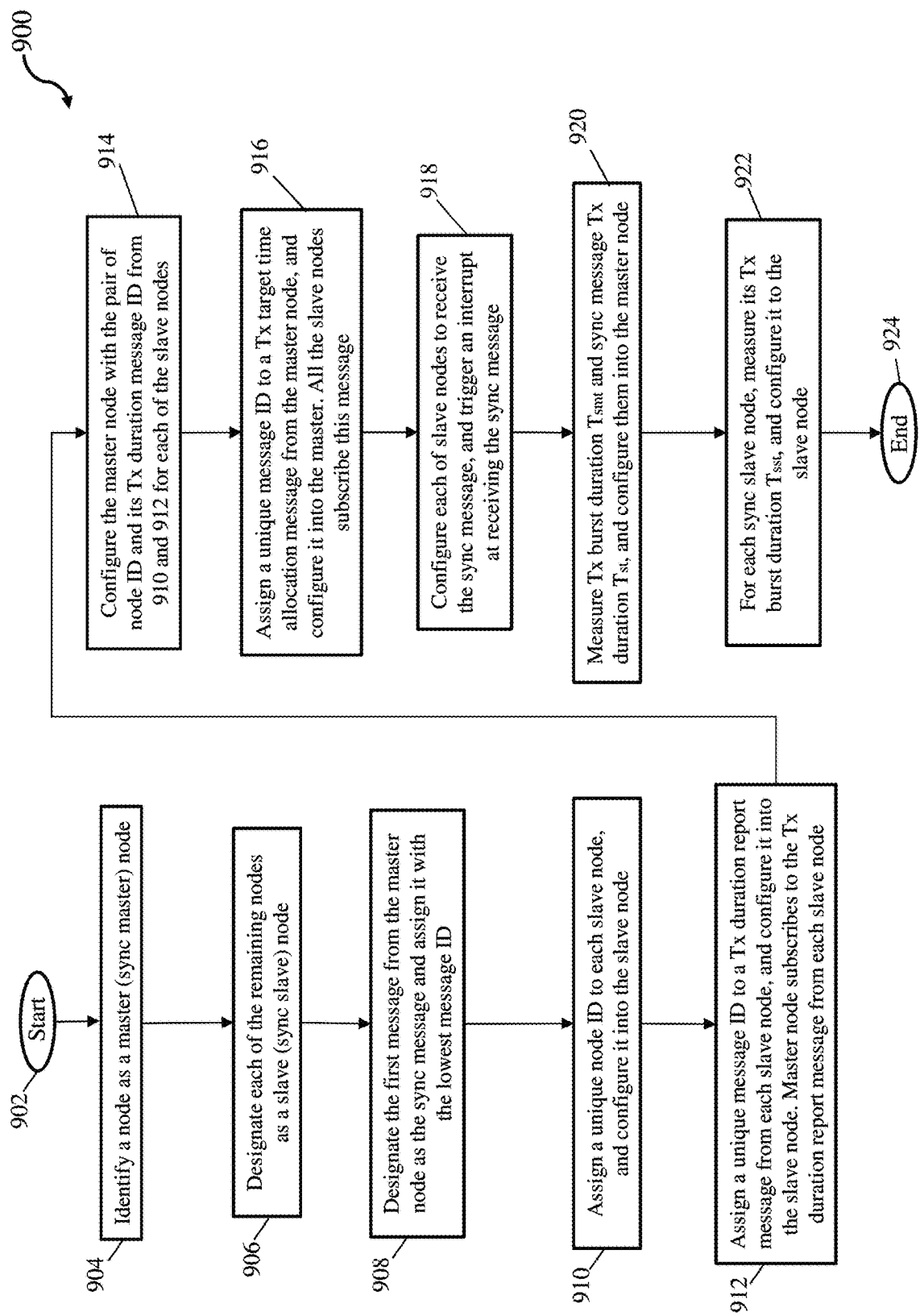
FIG. 9 depicts a flow diagram of a set of rules to design/develop a synchronized CAN network according to a non-limiting embodiment.

Turning now to FIG. 9, a flow diagram 900 illustrates a set of rules to design/develop a CAN synchronization network according to a non-limiting embodiment. The method begins with procedure 902, and identifies a node as a sync master node in procedure 904. In procedure 906, each of the remaining nodes is designated as a sync slave node. In procedure 908, the first message from the master node is designated as the sync message and it is assigned with the lowest message ID. In procedure 910, a unique node ID is assigned to each slave node, and each slave node is configured with the assigned node ID. In procedure 912, a unique message ID is assigned to a Tx duration report message from each slave node and configured into the slave node. The master node subscribes to the Tx duration report message from each slave node. In procedure 914, the master node is configured with a pair of node ID and the Tx duration message ID from procedure 910 and 912 for each of the slave nodes. In procedure 916, typically, a unique message ID is assigned to a Tx target time allocation message from the master node and configured into the master node, and all the slave nodes subscribe to the message. Alternatively, multiple message IDs may be assigned to different Tx target time allocation messages. The master node may transmit all of them in a CAN task cycle to speed up the network synchronization. In that case, the slave nodes may be divided into multiple groups, each of the groups subscribes to a different Tx target time allocation message. Thus, these message IDs need to be configured in the corresponding entries of the list 702 in the master node and their image instances in the slave nodes. In procedure 918, each of the slave nodes is configured to receive the sync message, and trigger an interrupt at receiving the sync message. In procedure 920, the $T_{smt}$, and the $T_{st}$, are each measured, and configured into the master node. In procedure 922, the $T_{sst}$ for each slave node is measured and configured into the respective slave node.

Figure 10:
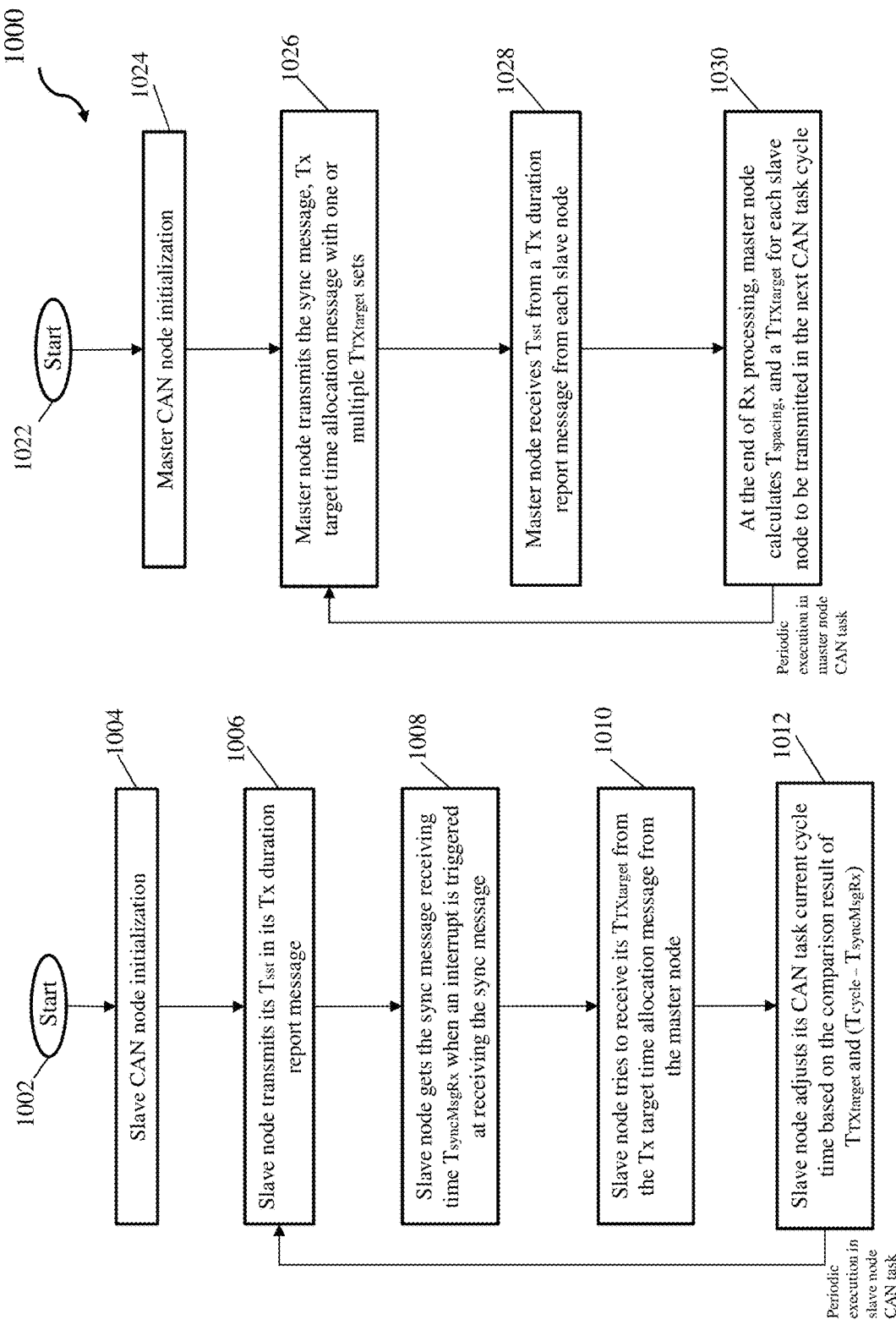
FIG. 10 depicts a flow diagram illustrating a method of synchronizing CAN nodes at runtime according to a non-limiting embodiment.

Turning now to FIG. 10, a flow diagram 1000 illustrates a method for synchronizing CAN nodes at runtime according to a non-limiting embodiment. On the left side of FIG. 10, a method for the slave node is depicted. The method applies to each of the slave nodes on the CAN network. The method begins with procedure 1002. In execution procedure 1004, the slave node initializes the CAN task among other initialization procedures. In execution procedure 1006, the slave node transmits its Tx burst duration $T_{sst}$ in its Tx duration report message. In execution procedure 1008, when the interrupt is triggered at receiving the sync message, the slave node retrieves $T_{syncMsgRx}$, time elapse from the start of the CAN task current cycle to the point of time the sync message is received. In execution procedure 1010, the slave node tries to receive its Tx target time $T_{TXtarget}$ from the Tx target time allocation message. In execution procedure 1012, at the end of Rx procedures, the slave node adjusts its CAN task current cycle time based on the comparison result of $T_{TXtarget}$ and $T_{TX}$ (derived from $T_{cycle} - T_{syncMsgRx}$). Alternatively, time adjustment in execution procedure 1012 may be part of procedure 1008. Note that the $T_{TXtarget}$ has not been received at this point for the CAN task current cycle, so the time adjustment in the context of the interrupt uses the $T_{TXtarget}$ received at the CAN task earlier cycle. This compares with the execution procedure 1012 where the $T_{TXtarget}$ at the end of Rx procedure may be fresh and so may be more accurate. The set of execution procedures from 1006 to 1012 is part of the slave node CAN task execution procedures, and may be configured to be executed periodically, for example once every CAN task cycle.

To save CAN bandwidth and processor/microcontroller processing, the slave node may stop transmitting its Tx duration report message once the CAN network startup is done and the network activities are stabilized. For instance, the slave node may keep transmitting its Tx duration report message and three more times after it receives the Tx target time allocation from the master node, which ensures that the master node has received the Tx duration report from the slave node. At post-initialization operation, if the slave node receives a Tx target time different from the one being used, the slave node may resume transmitting and transmit its Tx duration report message three times, which ensures that the master node has received the Tx duration report from the slave node after a possible restart of the master node. The slave node should use the new Tx target time transmitted from the master node, in case a node may just join the CAN network and the Tx target time would be different.

On the right side of FIG. 10, a method for the master node is depicted. The method begins with procedure 1022. In execution procedure 1024, the master node initializes the CAN task among other initialization procedures. In execution procedure 1026, the master node transmits the sync message, Tx target time allocation message with one or multiple $T_{TXtarget}$ sets. In execution procedure 1028, the master node receives $T_{sst}$ in a Tx duration report message from each slave node. In execution procedure 1030, at the end of Rx processing with all received messages, the master node calculates $T_{spacing}$, and a $T_{TXtarget}$ for each slave node to be transmitted in the next CAN task cycle. This set of execution procedures from 1026 to 1030 is part of the master node CAN task execution procedures, and may be configured to be executed periodically, for example once every CAN task cycle.

To save CAN bandwidth and processor/microcontroller processing, the master node may stop calculating and transmitting Tx target time allocation message once the CAN network startup is done and the network activities are stabilized. For instance, the master node may keep transmitting Tx target time allocation message until the network startup timer times out, which ensures that each of the slave nodes on the CAN bus has received its Tx target time allocation from the master node. At post-initialization operation, if the master node receives a Tx duration report message from a slave node and the $T_{sst}$ from the duration report message is the same as it is set in the list 702, the master node may resume transmitting and transmit the Tx target time allocation message three times with the Tx target time set to its corresponding $T_{TXtarget}$ in the list 702, to this slave node, which ensures that the slave node has received its Tx target time allocation after a possible restart of the slave node. At post-initialization operation, if the master node receives a Tx duration report message from a slave node and the $T_{sst}$ from the Tx duration report message is different from the one set in the list 702, the master node may resume calculating and transmitting and transmit a Tx target time allocation message three times to each slave on the network, and save each of the Tx target times to its corresponding $T_{TXtarget}$ in the list 702, which ensures that each of the slave nodes on the CAN Bus has received its Tx target time allocation after an unlikely startup of a slave node.

The flow diagram and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for synchronizing nodes on a controller area network (CAN) comprising:
   identifying, via a processor, a node from a plurality of nodes as a sync master node, and designating, via the processor, each of the remaining nodes as a sync slave node;
   designating, via the processor, a first message in a periodic message burst from the sync master node as a sync message;
   assigning, via the processor, a lowest number, among a plurality of message identifiers (IDs) in the CAN network, to a message ID of the sync message;
   subscribing to the sync message on each sync slave node;
   assigning, via the processor, a unique slave node ID to each sync slave node;
   assigning, via the processor, a unique message ID to each of a plurality of transmission duration report messages;
   subscribing to the plurality of transmission duration report messages on the sync master node;
   assigning, via the processor, a unique transmission target time allocation message ID to a transmission target time allocation message from the sync master node;
   subscribing to the transmission target time allocation message on each sync slave node;
   performing a handshake operation between the sync slave nodes and the sync master node to exchange message burst transmission durations ($T_{sst}$), transmission target times ($T_{TXtarget}$), and a common time reference point; and
   performing a time adjustment on each sync slave node based on a slave node message burst transmission time ($T_{TX}$), a transmission target time ($T_{TXtarget}$), and a sync message receiving time ($T_{syncMsgRx}$) used as the common time reference point from which ($T_{TX}$) and ($T_{TXtarget}$) are measured.

2. The computer-implemented method of claim 1, wherein performing the handshake operation further comprises:
   transmitting a sync message from the sync master node;
   triggering an interrupt to the processor of each sync slave node in response to receiving the sync message to retrieve the sync message receiving time ($T_{syncMsgRx}$) that is used as the common time reference point between ($T_{TX}$) and ($T_{TXtarget}$);
   transmitting, from each sync slave node among the plurality of sync slave nodes to the sync master node, a transmission duration report message that includes the assigned message ID, the slave node ID and its message burst transmission duration ($T_{sst}$);
   retrieving, via a sync master processor, the ($T_{sst}$) in a transmission duration report message from each sync slave node;
   determining, via the sync master processor at the end of processing all received messages, a transmission target time ($T_{TXtarget}$) for each sync slave node;
   transmitting, via the sync master processor, a transmission target time allocation message that includes the assigned transmission target time allocation message ID, an assigned slave node ID and its corresponding transmission target time ($T_{TXtarget}$) from the sync master node to each sync slave node; and
   retrieving, via each sync slave processor, the ($T_{TXtarget}$) included in the transmission target time allocation message from the sync master node.

3. The computer-implemented method of claim 2, wherein determining the transmission target time ($T_{TXtarget}$) comprises determining based at least in part on an optimal spacing time ($T_{spacing}$) between neighbor message bursts in an N node network.

4. The computer-implemented method of claim 3, wherein the optimal spacing time duration is derived by:

$$T_{spacing} = (T_{cycle} - (T_{smt} + T_{sst1} + T_{sst2} + \ldots + T_{sstN-2} + T_{sstN-1}))/N; \text{ wherein:}$$

$T_{cycle}$ is a transmission cycle duration equal and tied to a predetermined CAN task cycle time;
$T_{smt}$ is a sync master node message burst duration;
$T_{sst1}$ is a sync slave node 1 message burst duration, received from sync slave node 1;
$T_{sst2}$ is a sync slave node 2 message burst duration, received from sync slave node 2;
$T_{sstN-2}$ is a sync slave node N-2 message burst duration, received from sync slave node N-2;
$T_{sstN-1}$ is a sync slave node N-1 message burst duration, received from sync slave node N-1; and
wherein a message burst transmission target time $T_{TXtarget}$ is derived by:

$$T_{TXtargetJ} = (T_{smt\text{-}} + T_{sst1} + \ldots + T_{sstJ-1}) + J*T_{spacing};$$
wherein:

$T_{smt\text{-}}$ represents ($T_{smt} - T_{st}$), $T_{st}$ represents the sync message transmission duration, and
J is a sync slave node ID.

5. The computer-implemented method of claim 4, wherein the sync message transmission duration ($T_{st}$) and the message burst transmission duration ($T_{smt}$) for the sync master node are predetermined measured durations and configured into the sync master node, and the message burst duration ($T_{sst}$) for a sync slave node is a predetermined measured duration and configured into the sync slave node.

6. The computer-implemented method of claim 4, wherein performing the time adjustment on a sync slave node comprises:
   using the retrieved sync message receiving time ($T_{syncMsgRx}$) as the time reference point for a slave node message burst transmission time ($T_{TX}$);
   comparing the slave node message burst transmission time ($T_{TX}$) to its message burst transmission target time ($T_{TXtarget}$) on the sync slave node; and
   moving the message burst transmission time closer to its message burst transmission target time by increasing a CAN task current cycle time with a predefined time adjustment if the slave node message burst transmission time ($T_{TX}$) occurs before its message burst transmission target time ($T_{TXtarget}$) on the sync slave node or by decreasing the CAN task current cycle time with a predefined time adjustment if the slave node message burst transmission time ($T_{TX}$) occurs after its message burst transmission target time ($T_{TXtarget}$) on the sync slave node.

7. The computer-implemented method of claim 6, wherein the slave node message burst transmission time ($T_{TX}$) is determined as ($T_{cycle}$)−($T_{syncMsgRx}$), wherein ($T_{cycle}$) is a transmission cycle duration equal and tied to the predetermined CAN task cycle time, and ($T_{syncMsgRx}$) is the sync message receiving time used as the common time reference point between ($T_{TX}$) and ($T_{TXtarget}$).

8. A controller area network (CAN) synchronization comprising:
   a plurality of nodes, each node including a processor;
   at least one of the processors in a respective node in signal communication with at least another processor among the plurality of nodes, the at least one processor configured to:
   identify via the processor, a node as a sync master node from the plurality of nodes, and to designate each of the remaining nodes as a sync slave node;
   designate a first message included in a periodic message burst from the sync master node as a sync message;
   assign a lowest number, among a plurality of message IDs in the CAN network, to a message ID of the sync message;
   subscribe to the sync message on each sync slave node;
   assign a unique node ID to each sync slave node;
   assign a unique message ID to each of a plurality of transmission duration report messages;
   subscribe to the plurality of transmission duration report messages on the sync master node;
   assign a unique transmission target time allocation message ID to a transmission target time allocation message from the sync master node;
   subscribe to the transmission target time allocation message on each sync slave node;
   wherein the system performs a handshake operation between the sync slave nodes and the sync master node to exchange message burst transmission durations ($T_{sst}$), transmission target times ($T_{TXtarget}$), and a common time reference point; and
   performs a time adjustment on each sync slave node based on a slave node message burst transmission time ($T_{TX}$), the transmission target times ($T_{TXtarget}$), and a sync message receiving time ($T_{syncMsgRx}$) used as the common time reference point from which ($T_{TX}$) and ($T_{TXtarget}$) are measured.

9. The CAN network of claim 8, wherein the handshake operation further comprises:
   transmitting the sync message from the sync master node;
   triggering an interrupt to the processor of each sync slave node in response to receiving the sync message to retrieve a sync message receiving time ($T_{syncMsgRx}$) that is used as the common time reference point between ($T_{TX}$) and ($T_{TXtarget}$);
   transmitting, from a sync slave node, a Tx duration report message that includes a corresponding assigned message ID, the slave node ID and its message burst transmission durations ($T_{sst}$);
   retrieving, via the processor of the sync master node, the ($T_{sst}$) in a transmission duration report message from the sync slave node;
   determining, via the processor of the sync master node at the end of processing all received messages, a transmission target time ($T_{TXtarget}$) for each sync slave node;
   transmitting, via the processor of the sync master node, a Tx target time allocation message with the assigned message ID, a slave node ID and its corresponding transmission target time ($T_{TXtarget}$) from the sync master node to each sync slave node; and
   retrieving, via the processor of each sync slave node, the ($T_{TXtarget}$) included in the transmission target time message from the sync master node.

10. The CAN network of claim 9, wherein the transmission target time ($T_{TXtarget}$) is based at least in part on an optimal spacing time ($T_{spacing}$) between neighbor message bursts in an N node network.

11. The CAN network of claim 10, wherein the optimal spacing time is derived by:

$$T_{spacing} = (T_{cycle} - (T_{smt} + T_{sst1} + T_{sst2} + \ldots + T_{sstN-2} + T_{sstN-1}))/N;$$ wherein:

$T_{cycle}$ is a transmission cycle duration equal and tied to a predetermined CAN task cycle time;
$T_{smt}$ is a sync master node message burst duration;
$T_{sst1}$ is a sync slave node 1 message burst duration, received from sync slave node 1;
$T_{sst2}$ is a sync slave node 2 message burst duration, received from sync slave node 2;
$T_{sstN-2}$ is a sync slave node N−2 message burst duration, received from sync slave node N−2;
$T_{sstN-1}$ is a sync slave node N−1 message burst duration, received from sync slave node N−1; and
wherein a message burst transmission target time $T_{TXtarget}$ is derived by:

$$T_{TXtargetJ} = (T_{smt-} + T_{sst1} + \ldots + T_{ssJ-1}) + J \ast T_{spacing};$$
wherein:

$T_{smt-}$ represents ($T_{smt} - T_{st}$), $T_{st}$ represents the sync message transmission duration, and
J is a sync slave node ID.

12. The CAN network of claim 11, wherein the sync message transmission duration ($T_{st}$) and the message burst transmission duration ($T_{smt}$) for the sync master node are predetermined measured durations and configured into the sync master node, and the message burst duration ($T_{sst}$) for a sync slave node is a predetermined measured duration and configured into the sync slave node.

13. The CAN network of claim 11, wherein the processor performs the time adjustment on a sync slave node by performing operations of:
   using the retrieved sync message receiving time ($T_{syncMsgRx}$) as the time reference point for a slave node message burst transmission time ($T_{TX}$);
   comparing the slave node message burst transmission time ($T_{TX}$) to its message burst transmission target time ($T_{TXtarget}$) on the sync slave node; and
   moving the message burst transmission time closer to its message burst transmission target time by increasing a CAN task current cycle time with a predefined time adjustment if the slave node message burst transmission time ($T_{TX}$) occurs before its message burst transmission target time ($T_{TXtarget}$) on the sync slave node or by decreasing the CAN task current cycle time with a predefined time adjustment if the slave node message burst transmission time ($T_{TX}$) occurs after its message burst transmission target time ($T_{TXtarget}$) on the sync slave node.

14. The CAN network of claim 13, wherein the slave node message burst transmission time ($T_{TX}$) is determined as ($T_{cycle}$)−($T_{syncMsgRx}$), wherein ($T_{cycle}$) is a transmission cycle duration equal and tied to the predetermined CAN task cycle time, and ($T_{syncMsgRx}$) is the sync message receiving time used as the common time reference point between ($T_{TX}$) and ($T_{TXtarget}$).

15. An aircraft having a system for synchronizing nodes on a controller area network (CAN), the system configured to:

identify, via a processor, a sync master node from the plurality of nodes, and to designate, via the processor, each of remaining nodes as a sync slave node;

designate, via the processor, a first message in a periodic message burst from the sync master node as a sync message;

assign, via the processor, a lowest number, among a plurality of message IDs in the CAN network, to the message ID of the sync message;

subscribe to the sync message on each sync slave node;

assign, via the processor, a unique node ID to each sync slave node;

assign, via the processor, a unique message ID to each of a plurality of transmission duration report messages;

subscribe to the plurality of transmission duration report messages on the sync master node;

assign, via the processor, a unique transmission target time allocation message ID to a transmission target time allocation message from the sync master node; and subscribe to the transmission target time message on each sync slave node;

wherein the system performs a handshake operation between the sync slave nodes and the sync master node to exchange message burst transmission durations ($T_{sst}$), transmission target times ($T_{TXtarget}$), and a common time reference point, and wherein the system performs a time adjustment on a sync slave node based on a slave node message burst transmission time ($T_{TX}$), the transmission target times ($T_{TXtarget}$), and a sync message receiving time ($T_{syncMsgRx}$) used as the common time reference point from which ($T_{TX}$) and ($T_{TXtarget}$) are measured.

16. The aircraft of claim 15, wherein the handshake operation further comprises:

transmitting a sync message from the sync master node;

triggering an interrupt to the processor of each sync slave node in response to receiving the sync message to retrieve the sync message receiving time ($T_{syncMsgRx}$) that is used as the common time reference point between ($T_{TX}$) and ($T_{TXtarget}$);

transmitting, from each sync slave node, a transmission duration report message that includes a corresponding assigned message ID, the slave node ID and its message burst transmission duration ($T_{sst}$);

retrieving, via the sync master node, the message burst transmission duration ($T_{sst}$) in a transmission duration report message from the sync slave node;

determining, via the sync master node at the end of processing all received messages, a transmission target time ($T_{TXtarget}$) for each sync slave node;

transmitting, via the processor of the sync master node, a transmission target time allocation message with the assigned message ID, a slave node ID and its corresponding transmission target time ($T_{TXtarget}$) from the sync master node to each sync slave node; and retrieving, via the sync slave node, the transmission target time ($T_{TXtarget}$) included in the transmission target time allocation message from the sync master node.

17. The aircraft of claim 16, wherein the transmission target time ($T_{TXtarget}$) is based at least in part on an optimal spacing time ($T_{spacing}$) between neighbor message bursts in an N node network, wherein the optimal spacing time ($T_{spacing}$) is derived by:

$$T_{spacing} = (T_{cycle} - (T_{smt} + T_{sst1} + T_{sst2} + \ldots + T_{sstN-2} + T_{sstN-1}))/N;$$ wherein:

$T_{cycle}$ is a transmission cycle duration equal and tied to a predetermined CAN task cycle time;

$T_{smt}$ is a sync master node message burst duration;

$T_{sst1}$ is a sync slave node 1 message burst duration, received from sync slave node 1;

$T_{sst2}$ is a sync slave node 2 message burst duration, received from sync slave node 2;

$T_{sstN-2}$ is a sync slave node N-2 message burst duration, received from sync slave node N-2;

$T_{sstN-1}$ is a sync slave node N-1 message burst duration, received from sync slave node N-1; and wherein a message burst transmission target time ($T_{TXtarget}$) is derived by:

$$T_{TXtarget}^J = (T_{smt-} + T_{sst1} + \ldots + T_{sstJ-1}) + J*T_{spacing};$$
wherein:

$T_{smt-}$ represents ($T_{smt} - T_{st}$), $T_{st}$ represents the sync message transmission duration, and J is a sync slave node ID.

18. The aircraft of claim 17, wherein the sync message transmission duration ($T_{st}$) and the message burst duration ($T_{smt}$) for the sync master node are predetermined measured durations and configured into the sync master node, and the message burst transmission duration ($T_{sst}$) for a sync slave node is a predetermined measured duration and configured into the sync slave node.

19. The aircraft of claim 17, wherein performing the time adjustment on a sync slave node comprises:

using the retrieved sync message receiving time ($T_{syncMsgRx}$) as the time reference point for a slave node message burst transmission time ($T_{TX}$);

comparing the slave node message burst transmission time ($T_{TX}$) to its message burst transmission target time ($T_{TXtarget}$) on the sync slave node; and moving the message burst transmission time closer to its message burst transmission target time by increasing a CAN task current cycle time with a predefined time adjustment if the slave node message burst transmission time ($T_{TX}$) occurs before its message burst transmission target time ($T_{TXtarget}$) on the sync slave node or by decreasing the CAN task current cycle time with a predefined time adjustment if the slave node message burst transmission time ($T_{TX}$) occurs after its message burst transmission target time ($T_{TXtarget}$) on the sync slave node.

20. The aircraft of claim 19, wherein the slave node message burst transmission time ($T_{TX}$) is determined as ($T_{cycle}$)−($T_{syncMsgRx}$), wherein ($T_{cycle}$) is a transmission cycle duration equal and tied to the predetermined CAN task cycle time, and ($T_{syncMsgRx}$) is the sync message receiving time used as the common time reference point between ($T_{TX}$) and ($T_{TXtarget}$).

* * * * *